United States Patent
Yasui et al.

(10) Patent No.: US 6,477,458 B1
(45) Date of Patent: Nov. 5, 2002

(54) AIR-FUEL RATIO CONTROL APPARATUS FOR INTERNAL COMBUSTION ENGINE

(75) Inventors: Yuji Yasui, Wako (JP); Yoshikazu Oshima, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 201 days.

(21) Appl. No.: 09/708,679

(22) Filed: Nov. 9, 2000

(30) Foreign Application Priority Data

Nov. 12, 1999 (JP) .......................................... 11-322427

(51) Int. Cl.$^7$ .......................... G05B 13/04; F02D 41/14
(52) U.S. Cl. .......................... 701/109; 123/692; 60/276; 60/285
(58) Field of Search .............................. 701/109, 103, 701/101, 102, 108, 115; 123/674, 690, 691, 692, 704; 60/274, 276, 285

(56) References Cited

U.S. PATENT DOCUMENTS

| | | | |
|---|---|---|---|
| 5,694,910 A | 12/1997 | Hasegawa et al. | 123/674 |
| 5,845,490 A | 12/1998 | Yasui et al. | 60/276 |
| 5,845,491 A | 12/1998 | Yasui et al. | 60/276 |
| 5,852,930 A | 12/1998 | Yasui et al. | 60/276 |
| 5,880,952 A | 3/1999 | Yasui et al. | 701/103 |
| 5,924,281 A | 7/1999 | Yasui et al. | 60/276 |
| 6,079,205 A | 6/2000 | Yasui et al. | 60/276 |
| 6,082,099 A | 7/2000 | Yasui et al. | 60/276 |
| 6,112,517 A | 9/2000 | Yasui et al. | 60/274 |
| 6,230,486 B1 * | 5/2001 | Yasui et al. | 60/274 |
| 6,266,605 B1 * | 7/2001 | Yasui et al. | 60/276 |
| 6,327,850 B1 * | 12/2001 | Yasui et al. | 123/692 |
| 6,351,943 B1 * | 3/2002 | Tagami et al. | 701/109 |
| 6,370,473 B1 * | 4/2002 | Yasui et al. | 701/109 |

FOREIGN PATENT DOCUMENTS

| | | |
|---|---|---|
| JP | 4-369471 | 12/1992 |
| JP | 5-79374 | 3/1993 |
| JP | 7-83094 | 3/1995 |
| JP | 8-21273 | 1/1996 |
| JP | 8-105345 | 4/1996 |
| JP | 9-324681 | 12/1997 |

OTHER PUBLICATIONS

Ser. No.: 09/311,353, filed: May 13, 1999; By: Yuji Yasui et al For: Plant Control System.
Ser. No. 09/465,765, filed: Dec. 17, 1999; By: Yuji Yasui et al For: Air–Fuel Ratio Control System for Internal Combustion Engine.
Ser. No. 09/465,395, filed: Dec. 17, 1999; By; Yuji Yasui et al For: Plant Control System.
Ser. No. 09/465,766, filed: Dec. 17, 1999; By: Yuji Yasui et al For: Plant Control System.
Ser. No. 09/499,975, filed: Feb. 8, 2000; By: Yuji Yasui et al For: Air–Fuel Ratio Control System for Internal Combustion Engine.
Ser. No. 09/548,931; filed: Apr. 13, 2000; By: Yuji Yasui For: Plant Control System.

* cited by examiner

*Primary Examiner*—Hieu T. Vo
(74) *Attorney, Agent, or Firm*—Squire, Sanders & Dempsey LLP

(57) ABSTRACT

The characteristics of the output of an exhaust gas sensor with respect to the air-fuel ratio of an engine are expressed by a nonlinear function such as a quadratic function or the like, and the parameters of the nonlinear function are sequentially identified according to a sequential identifying algorithm using the data of the output of the exhaust gas sensor and the data of the output of an air-fuel ratio sensor which detects the air-fuel ratio of the engine. An air-fuel ratio at which the function value of the nonlinear function whose parameters have been identified is used as a target air-fuel ratio, and the air-fuel ratio of the engine is controlled at the target air-fuel ratio.

10 Claims, 17 Drawing Sheets

AIR-FUEL RATIO CONTROL APPARATUS FOR INTERNAL COMBUSTION ENGINE

BACKGROUND OF THE INVENTION

1. Field of the Invention

The present invention relates to an apparatus for controlling the air-fuel ratio of an internal combustion engine.

2. Description of the Related Art

Generally, catalytic converters such as three-way catalytic converters are disposed in the exhaust passages of internal combustion engines for purifying gas components including HC (hydrocarbon), NOx (nitrogen oxides), etc. contained in the exhaust gas emitted from the internal combustion engines. There have been proposed techniques of controlling the air-fuel ratio of an air-fuel mixture to be combusted by an internal combustion engine in order to maximize the purification rate at which gas components such as HC, NOx are purified by the catalytic converter.

For example, the applicant of the present application has proposed a system for achieving an optimum exhaust gas purifying capability of a catalytic converter by sequentially determining a target value for the air-fuel ratio of an exhaust gas upstream of the catalytic converter according to a feedback control process in order to converge an output (detected value of oxygen concentration) of an $O_2$ sensor (oxygen concentration sensor) disposed downstream of the catalytic converter to a predetermined target value (constant value), and manipulating the air-fuel ratio of an air-fuel mixture to be combusted by an internal combustion engine to equalize the air-fuel ratio of the exhaust gas upstream of the catalytic converter with the target air-fuel ratio. See, for example, Japanese laid-open patent publication No. 9-324681 and U.S. Pat. No. 5,852,930, for details. The air-fuel ratio of the exhaust gas upstream of the catalytic converter specifically represents the air-fuel ratio recognized from the oxygen concentration of the exhaust gas that enters the catalytic converter, i.e., the air-fuel ratio of the air-fuel mixture which has been combusted by the internal combustion engine to produce the exhaust gas. This air-fuel ratio will hereinafter be referred to as the air-fuel ratio of the internal combustion engine.

By controlling the air-fuel ratio of the internal combustion engine at an air-fuel ratio state to converge (set) the output of the $O_2$ sensor disposed downstream of the catalytic converter to the predetermined target value, it is possible to achieve the optimum capability of the catalytic converter to purify HC, NOx, etc., i.e., the purifying capability to maximize the purification rate of HC, NOx, etc., irrespective of the deteriorated state of the catalytic converter.

In recent years, there have been developed exhaust gas sensors, specifically HC sensors and NOx sensors, capable of detecting relatively accurately the concentrations of various gas components, including HC, NOx, etc., to be purified by catalytic converters. Some of these exhaust gas sensors generally have their output levels increasing substantially linearly as the concentrations of the detected gas components increase. The output levels of other exhaust gas sensors decrease as the concentrations of the detected gas components increase. The output characteristics of the exhaust gas sensors of the former type will hereinafter be referred to as positive characteristics, and the output characteristics of the exhaust gas sensors of the latter type will hereinafter be referred to as negative characteristics.

If such exhaust gas sensors are used, then it may be possible to control the purification of a gas component by a catalytic converter at a desired state while the concentration of the gas component purified by the catalytic converter is being observed.

For example, such an exhaust gas sensor may be disposed downstream of the catalytic converter, and a target air-fuel ratio for the internal combustion engine may be determined in order to equalize the output of the exhaust gas sensor or the concentration of the gas component recognized from the output of the exhaust gas sensor, i.e., the detected value of the concentration, with a desired value, and the air-fuel ratio of the air-fuel mixture combusted by the internal combustion engine may be controlled based on the target air-fuel ratio.

According to the inventor's finding, however, the purification rate of a gas component such as HC, NOx, etc. by the catalytic converter is basically maximum when the air-fuel ratio of the internal combustion engine is of a certain value, basically a value near a stoichiometric air-fuel ratio, and is reduced when the air-fuel ratio of the internal combustion engine is shifted into an air-fuel ratio range that is either leaner or richer than that certain value of the air-fuel ratio. Therefore, the concentration of the gas component recognized from the output of the exhaust gas sensor disposed downstream of the catalytic converter has a minimum value as the air-fuel ratio of the internal combustion engine changes. The output of the exhaust gas sensor which has the positive characteristics has a minimum value as the air-fuel ratio of the internal combustion engine changes, and the output of the exhaust gas sensor which has the negative characteristics has a maximum value as the air-fuel ratio of the internal combustion engine changes.

When the output of the exhaust gas sensor or the concentration of the gas component recognized from the output of the exhaust gas sensor differs from a desired value, it is difficult to identify which of the leaner and richer air-fuel ratio ranges the air-fuel ratio of the internal combustion engine should be changed into in order to eliminate the difference. Therefore, it is difficult according to the conventional feedback control process which employs the $O_2$ sensor disposed downstream of the catalytic converter to determine a target air-fuel ratio for controlling the output of the exhaust gas sensor at the desired value.

There has been a demand for a new technique of controlling, at a desired value, the output of an exhaust gas sensor that is disposed downstream of a catalytic converter, for detecting the concentration of a gas component to be purified by the catalytic converter, such as HC, NOx, etc.

SUMMARY OF THE INVENTION

It is therefore an object of the present invention to provide an apparatus for controlling the air-fuel ratio of an internal combustion engine to control, well at a desired value, the output of an exhaust gas sensor that is disposed downstream of a catalytic converter, for detecting the concentration of a gas component to be purified by the catalytic converter, such as HC, NOx, etc., or the concentration of the gas component recognized from the output of the exhaust gas sensor.

To accomplish the above object, there is provided in accordance with the present invention an apparatus for controlling the air-fuel ratio of an internal combustion engine, comprising an exhaust gas sensor for detecting the concentration of a particular component in an exhaust gas purified by a catalytic converter which is disposed in an exhaust passage of the internal combustion engine, the exhaust gas sensor being disposed downstream of the catalytic converter, identifying means for identifying the values of parameters of a nonlinear function representing correlating characteristics of the detected concentration of the particular component with respect to an air-fuel ratio of the particular component upstream of the catalytic converter, using data representing the air-fuel ratio of the exhaust gas upstream of the catalytic converter and output data of the exhaust gas sensor, target air-fuel ratio calculating means for determining the value of an air-fuel ratio at which the concentration of the particular component that is represented by a function value of the nonlinear function whose parameters are identified by the identifying means is of a value satisfying a predetermined condition, using the identified values of the parameters of the non-linear function, and obtaining the determined value of the air-fuel ratio as a target air-fuel ratio for the exhaust gas upstream of the catalytic converter, and air-fuel ratio manipulating means for manipulating the air-fuel ratio of an air-fuel mixture combusted by the internal combustion engine depending on the target air-fuel ratio determined by the target air-fuel ratio calculating means.

The nonlinear function has an independent variable represented by data which indicates the air-fuel ratio of the exhaust gas upstream of the catalytic converter, e.g., the output of a sensor-for detecting the air-fuel ratio, the air-fuel ratio recognized from the output of the sensor, or a target value of the air-fuel ratio, and a dependent variable represented by the output of the exhaust gas sensor or the concentration of the particular component recognized from the output of the exhaust gas sensor. The nonlinear function preferably comprises a function of higher degree, e.g., a quadratic function or a cubic function. The parameters are specifically parameters which define the shape of a graphic configuration of the nonlinear function. For example, if the nonlinear function comprises a function of higher degree, e.g., a quadratic function or a cubic function, then the coefficients of terms of various degrees and the constant term of the function serve as the parameters.

The air-fuel ratio of the exhaust gas upstream of the catalytic converter specifically comprises the air-fuel ratio recognized from the concentration of oxygen in the exhaust gas. The air-fuel ratio will sometimes be referred to as the air-fuel ratio of the internal combustion engine.

The identifying means identifies the values of parameters of the nonlinear function using data representing the air-fuel ratio of the internal combustion engine and output data of the exhaust gas sensor, i.e., data of the detected concentration of the particular component. In this manner, the nonlinear function is determined which approximately expresses, with an equation, the correlating characteristics of the detected concentration of the particular component with respect to the air-fuel ratio of the internal combustion engine, i.e., the graphic configuration of the nonlinear function is determined.

Generally, the concentration of the particular component detected by the exhaust gas sensor, i.e., the concentration of the particular component purified by the catalytic converter, has a minimum value as the air-fuel ratio of the internal combustion engine changes. The above correlating characteristics can properly be expressed by a nonlinear function of a suitable type, e.g., a quadratic function or a cubic function.

When the values of the parameters are thus identified to determine the nonlinear function representative of the correlating characteristics, it is possible to calculate, using the identified values of the parameters of the nonlinear function, the value of the air-fuel ratio of the internal combustion engine (the value of the independent variable of the nonlinear function) at which the concentration of the particular component represented by the function value of the nonlinear function (the value of the dependent variable) is of a value (desired value) satisfying a predetermined condition. Since the nonlinear function approximately expresses the correlating characteristics, the calculated value of the air-fuel ratio is capable of controlling the actual concentration of the particular component detected by the exhaust gas sensor at the above desired value.

The target air-fuel ratio calculating means determines the value of the air-fuel ratio at which the concentration of the particular component that is represented by the function value of the nonlinear function is of the value satisfying the predetermined condition, using the identified values of the parameters of the nonlinear function, and obtains the determined value of the air-fuel ratio as the target air-fuel ratio for the internal combustion engine, i.e., the target value of the air-fuel ratio of the exhaust gas upstream of the catalytic converter. The air-fuel ratio manipulating means manipulates the air-fuel ratio of the air-fuel mixture combusted by the internal combustion engine depending on the target air-fuel ratio determined by the target air-fuel ratio calculating means. In this fashion, the air-fuel ratio of the internal combustion engine is manipulated to equalize the concentration of the particular component detected by the exhaust gas sensor with the value satisfying the predetermined condition, i.e., to equalize the output of the exhaust sensor or the concentration (detected value of the concentration) of the particular component recognized from the output of the exhaust sensor with the desired value.

Therefore, the output of the exhaust sensor disposed downstream of the catalytic converter or the concentration of the particular component recognized from the output of the exhaust sensor can well be controlled at the desired value.

The particular component whose concentration is detected by the exhaust gas sensor is specifically HC (hydrocarbon), NOx (nitrogen oxide), or the like.

The data representing the air-fuel ratio of the internal combustion engine, i.e., the air-fuel ratio of the exhaust gas upstream of the catalytic converter, which is used by the identifying means to identify the values of the parameters of the nonlinear function, may comprise data representing the air-fuel ratio itself, but should preferably comprise data representing the difference between the air-fuel ratio of the internal combustion engine and a predetermined reference value.

Using the data representing the difference between the air-fuel ratio of the internal combustion engine and the predetermined reference value, the identified values of the parameters of the nonlinear function are of increased accuracy.

For the identifying means to identify the values of the parameters of the nonlinear function, the target air-fuel ratio determined by the target air-fuel ratio calculating means may be used as the air-fuel ratio of the internal combustion engine. Preferably, however, an air-fuel ratio sensor is disposed upstream of the catalytic converter, for detecting the air-fuel ratio of the exhaust gas upstream of the catalytic converter, and the identifying means may comprise means for identifying the values of the parameters of the nonlinear function using the air-fuel ratio detected by the air-fuel ratio sensor as the air-fuel ratio of the internal combustion engine.

Using the air-fuel ratio detected by the air-fuel ratio sensor, i.e., the actual value of the air-fuel ratio of the internal combustion engine, i.e., the air-fuel ratio of the exhaust gas upstream of the catalytic converter, the values of the parameters of the nonlinear function can be identified with high accuracy.

The air-fuel ratio manipulating means may comprise means for manipulating the air-fuel ratio of the air-fuel mixture combusted by the internal combustion engine according to a feedback control process for converging the air-fuel ratio detected by the air-fuel ratio sensor to the target air-fuel ratio determined by the target air-fuel ratio calculating means.

It is thus possible to control the air-fuel ratio of the internal combustion engine properly at the target air-fuel ratio, and control the output of the exhaust gas sensor accurately at the desired value. As a result, the catalytic converter can reliably maintain its desired purifying capability for purifying the particular component.

The air-fuel ratio of the internal combustion engine should preferably be manipulated according to the feedback control process by a recursive-type feedback control means such as an adaptive controller. The recursive-type feedback control means determines a new feedback controlled quantity according to a given recursive formula containing a predetermined number of time-series data, prior to the present time, of the feedback controlled quantity of the air-fuel ratio, e.g., a corrective quantity for the amount of supplied fuel.

The target air-fuel ratio calculating means preferably comprise means for determining, as the target air-fuel ratio, the value of an air-fuel ratio at which the concentration of the particular component represented by the function value of the nonlinear function is of a minimum value.

The target air-fuel ratio serves to minimize the concentration of the particular component detected by the exhaust gas sensor, i.e., the concentration of the particular component that has been purified by the catalytic converter. When the air-fuel ratio of the air-fuel mixture combusted by the internal combustion engine is manipulated depending on the target air-fuel ratio, the air-fuel ratio of the internal combustion engine is controlled at an air-fuel ratio state in which the purification rate of the particular component by the catalytic converter is maximum. Thus, the particular component can be optimally purified by the catalytic converter in a manner to maximize the purification rate thereof. Stated otherwise, the ability of the catalytic converter to purify the particular component is maximized.

If the dependent variable of the nonlinear function is represented by the concentration of the particular component recognized from the output of the exhaust gas sensor, then the target air-fuel ratio is of a value that minimizes the function value itself of the nonlinear function. If the dependent variable of the nonlinear function is represented by the output of the exhaust gas sensor, and also if the characteristics of the output of the exhaust gas sensor with respect to the concentration of the particular component are positive, i.e., the characteristics are such that the output of the exhaust gas sensor increases as the concentration of the particular component increases, then the target air-fuel ratio is of a value that minimizes the function value itself of the nonlinear function. If the dependent variable of the nonlinear function is represented by the output of the exhaust gas sensor, and also if the characteristics of the output of the exhaust gas sensor with respect to the concentration of the particular component are negative, i.e., the characteristics are such that the output of the exhaust gas sensor decreases as the concentration of the particular component increases, then the concentration of the particular component represented by the function value of the nonlinear function decreases as the function value is greater. Therefore, the target air-fuel ratio is of a value that maximizes the function value itself of the nonlinear function.

Depending on the deteriorated state of the catalytic converter, the concentration of the particular component detected by the exhaust gas sensor may not have a minimum value as the air-fuel ratio of the internal combustion engine changes. For example, as described in detail later on, if the particular component is HC or NOx and the catalytic converter such as a three-way catalytic converter is brand-new, then when the air-fuel ratio of the internal combustion engine is in an air-fuel ratio range leaner or richer than a certain air-fuel ratio, the concentration of HC or NOx detected by the exhaust gas sensor, i.e., an HC sensor or an NOx sensor, is substantially constant, and does not have a minimum value.

In this case, the value of the air-fuel ratio at which the concentration of the particular component represented by the function value of the nonlinear function determined by the identifying means is of a minimum value, i.e., the target air-fuel ratio, may often be inappropriate or excessively lean or rich in purifying other gas components, though it may not pose problems for the catalytic converter to purify the particular component. If the actual concentration of the particular component detected by the exhaust gas sensor does not have a minimum value, then the minimum value of the concentration of the particular component represented by the function value of the nonlinear function cannot generally be employed in reality as representing the concentration detected by the exhaust gas sensor.

According to the present invention, the target air-fuel ratio calculating means comprises means for, if the minimum value of the concentration of the particular component represented by the function value of the nonlinear function falls out of a predetermined range, determining the value of an air-fuel ratio at which the concentration of the particular component represented by the function value of the nonlinear function is of a predetermined value, using the identified values of the parameters of the nonlinear function, and obtaining the determined value of the air-fuel ratio as the target air-fuel ratio, instead of determining, as the target air-fuel ratio, the value of the air-fuel ratio at which the concentration of the particular component represented by the function value of the nonlinear function is of the minimum value.

With the above arrangement, even in a situation where the concentration of the particular component detected by the exhaust gas sensor does not have a minimum value as the air-fuel ratio of the internal combustion engine changes, it is possible to determine a target air-fuel ratio for allowing the catalytic converter to well purify various gas components including the particular component. In a situation where the concentration of the particular component detected by the exhaust gas sensor has a minimum value, if the minimum value of the concentration of the particular component represented by the function value of the nonlinear function is an inappropriate value falling out of a predetermined range due to a disturbance, then it is possible to avoid the determination of a target air-fuel ratio that is not suitable for the catalytic converter to purify various gas components.

The parameters of the nonlinear function may be identified after the data of the air-fuel ratio sensor and the exhaust gas sensor have been collected and accumulated. However, the identifying means comprises means for sequentially identifying the values of the parameters of the nonlinear function according to a sequential identifying algorithm.

Since the sequential identifying algorithm is used, a memory capacity required to execute the sequential identifying algorithm may be small. Because the parameters of the nonlinear function are sequentially updated on a real-time basis to determine the nonlinear function, it is possible to sequentially determine the target air-fuel ratio depending on behavioral states of the catalytic converter and the internal combustion engine from instant to instant. As a result, the output of the exhaust gas sensor or the concentration of the particular component recognized from the output of the exhaust gas sensor can be controlled at the desired value with an increased response.

The sequential identifying algorithm may comprise any one of the algorithms of a sequential method of least squares, a sequential method of weighted least squares, a fixed gain method, a degressive gain method, etc. According to these algorithms, new values of the parameters are determined, i.e., the values of the parameters are updated, in order to minimize an error or difference between the value of the output of the exhaust gas sensor determined according to the nonlinear function using the present identified values of the parameters and the actual value of the output of the exhaust gas sensor.

In the present invention for the identifying means to use the sequential identifying algorithm, the identifying means preferably comprise means for identifying the values of the parameters of the nonlinear function while limiting at least one of the parameters to a value satisfying a predetermined condition.

Specifically, the parameters of the nonlinear function whose values are identified by the identifying means include such a parameter that if the value thereof is erroneously identified as a value falling out of a certain desired range due to disturbances or the like, the actual configuration of the graph of the correlating characteristics becomes largely different from the configuration of the graph of the nonlinear function. According to the present invention, when at least one of the parameters of the nonlinear function is to be identified, the value of the parameter is limited to a value which satisfies a certain condition. In this manner, the value of the parameter is prevented from being identified in error, and the nonlinear function representing the correlating characteristics is made reliable. As a consequence, the reliability of the target air-fuel ratio determined using the nonlinear function is increased If the nonlinear function comprises a quadratic function, then the identifying means comprises means for using the coefficient of a term of maximum degree of the quadratic function as the one of the parameters which is limited to the value, and limiting and identifying the value of the coefficient such that the concentration of the particular component represented by the function value of the quadratic function has a minimum value.

Specifically, the function value of the quadratic function has a minimum value or a maximum value depending on whether the coefficient of the term of maximum degree is positive or negative. If the identified value of the coefficient is of an inappropriate sign, i.e., positive or negative sign, then the concentration of the particular component represented by the function value of the quadratic function as the nonlinear function has a maximum value rather than a minimum value that it should have. For this reason, the identified value of the coefficient is limited so that the concentration of the particular component represented by the function value of the quadratic function has a minimum value. Specifically, the identified value of the coefficient is limited to a positive or negative value. In this manner, a basic match between the quadratic function as the nonlinear function representing the correlating characteristics and the correlating characteristics is reliably achieved.

More specifically, if the dependent variable of the quadratic function as the nonlinear function is represented by the concentration of the particular component recognized from the output of the exhaust gas sensor or the output of the exhaust gas sensor of positive characteristics, then the coefficient of the term of maximum degree of the quadratic function is limited to a positive value. If the dependent variable of the quadratic function is represented by the output of the exhaust gas sensor of negative characteristics, then the coefficient of the term of maximum degree of the quadratic function is limited to a negative value.

If the nonlinear function comprises a cubic function, then the identifying means comprises means for using the coefficient of a term of maximum degree of the cubic function as the one of the parameters which is limited to the value, and limiting and identifying the value of the coefficient such that the gradient of the graph of the cubic function in air-fuel ratio ranges on both sides of the value of an air-fuel ratio at which the concentration of the particular component represented by the function value of the cubic function has a minimum value, has a predetermined shape depending on the type of the particular component.

In the graph of the actual correlating characteristics of the concentration of the particular component detected by the exhaust gas sensor with respect to the air-fuel ratio of the internal combustion engine, the graph may have different gradients, i.e., the concentration of the particular component may change differently as the air-fuel ratio changes, in the air-fuel ratio ranges leaner and richer than the value of the air-fuel ratio at which the concentration of the particular component is of a minimum value, depending on the type of the particular component. The cubic function as the nonlinear function can have both maximum and minimum values irrespective of whether the coefficient of the term of maximum degree thereof is of a positive value or a negative value. However, the pattern of changes of the graph of the cubic function in the air-fuel ratio ranges on opposite sides of the air-fuel ratios corresponding to those extremal values differs depending on whether the coefficient of the term of maximum degree (third degree) thereof is of a positive value or a negative value.

The identified value of the coefficient is limited, i.e., it is limited to a positive value or a negative value, in order that the gradient of the graph of the cubic function in the air-fuel ratio ranges on opposite sides of the value of the air-fuel ratio at which the concentration of the particular component represented by the function value of the cubic function as the nonlinear function is of a minimum value is of a predetermined shape.

In this fashion, a match between the actual correlating characteristics and the cubic function as the nonlinear function is reliably achieved.

If the gradient of the graph of the correlating characteristics differs in the air-fuel ratio ranges that leaner and richer than the value of the air-fuel ratio at which the concentration of the particular component is of a minimum value, then the cubic function is preferable to the quadratic function as the nonlinear function for increasing the match between the nonlinear function and the correlating characteristics.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

An apparatus for controlling the air-fuel ratio of an internal combustion engine according to a first embodiment of the present invention will first be described below with reference to FIGS. 1 through 13.

Figure 1:
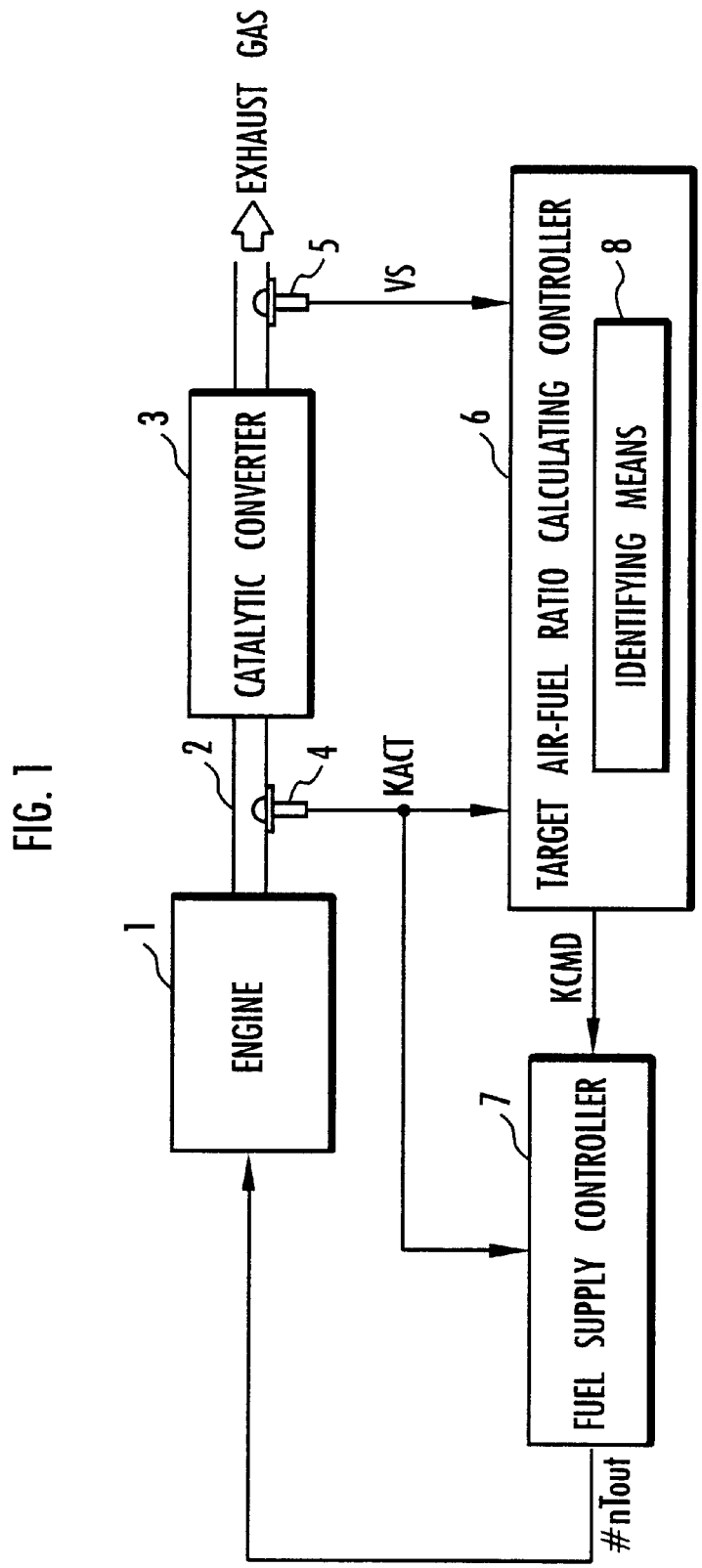
FIG. 1 is a block diagram of an overall system arrangement of a control apparatus according to a first embodiment of the present invention.

FIG. 1 shows in block form an overall system arrangement of the control apparatus according to the first embodiment of the present invention. As shown in FIG. 1, an internal combustion engine 1 comprises a four-cylinder engine mounted as a propulsion source on an automobile or a hybrid vehicle. Exhaust gases produced by the engine 1 when an air-fuel mixture is combusted in each of the cylinders of the engine 1 are combined by a common exhaust pipe 2 (exhaust passage) near the engine 1, and discharged from the exhaust pipe 2 into the atmosphere.

The exhaust pipe 2 has a catalytic converter 3, such as a three-way catalytic converter, for purifying the exhaust gas flowing through the exhaust pipe 2. The catalytic converter 3 purifies HC (hydrocarbons) and NOx (nitrogen oxides) in the exhaust gas according to an oxidizing/reducing action.

An air-fuel ratio sensor 4 is mounted on the exhaust pipe 2 upstream of the catalytic converter 3, more specifically, in a region where exhaust gases from the cylinders of the engine 1 are combined together, and an exhaust gas sensor 5 is mounted on the exhaust pipe 2 downstream of the catalytic converter 3.

The air-fuel ratio sensor 4 (hereinafter referred to as an "LAF sensor 4") generates an output KACT representing the detected value of an air-fuel ratio of an air-fuel mixture combusted by the engine 1, or more specifically, an air-fuel ratio recognized by an oxygen concentration in exhaust gases that are combinations of exhaust gases from the cylinders of the engine 1 (hereinafter referred to as an "air-fuel ratio of the engine 1"). The air-fuel ratio sensor 4 comprises a wide-range air-fuel ratio sensor described in detail in Japanese laid-open patent publication No. 4-369471 or U.S. Pat. No. 5,391,282. The air-fuel ratio sensor 4 generates an output KACT having a level proportional to the air-fuel ratio corresponding to the oxygen concentration in the exhaust gas in a relatively wide range of oxygen concentrations. That is, the output KACT of the air-fuel ratio sensor 4 changes linearly as the air-fuel ratio changes.

The exhaust gas sensor 5 comprises an NOx sensor for generating an output VS representing the detected value of an NOx concentration in the exhaust gas having passed through the catalytic converter 3, i.e., the concentration of NOx purified by the catalytic converter 3. As indicated by the solid-line curve in FIG. 2, the output VS of the exhaust gas sensor 5 has a level which increases linearly as the NOx concentration increases, i.e., substantially in proportion to the NOx concentration, and hence has positive characteristics.

Figure 2:
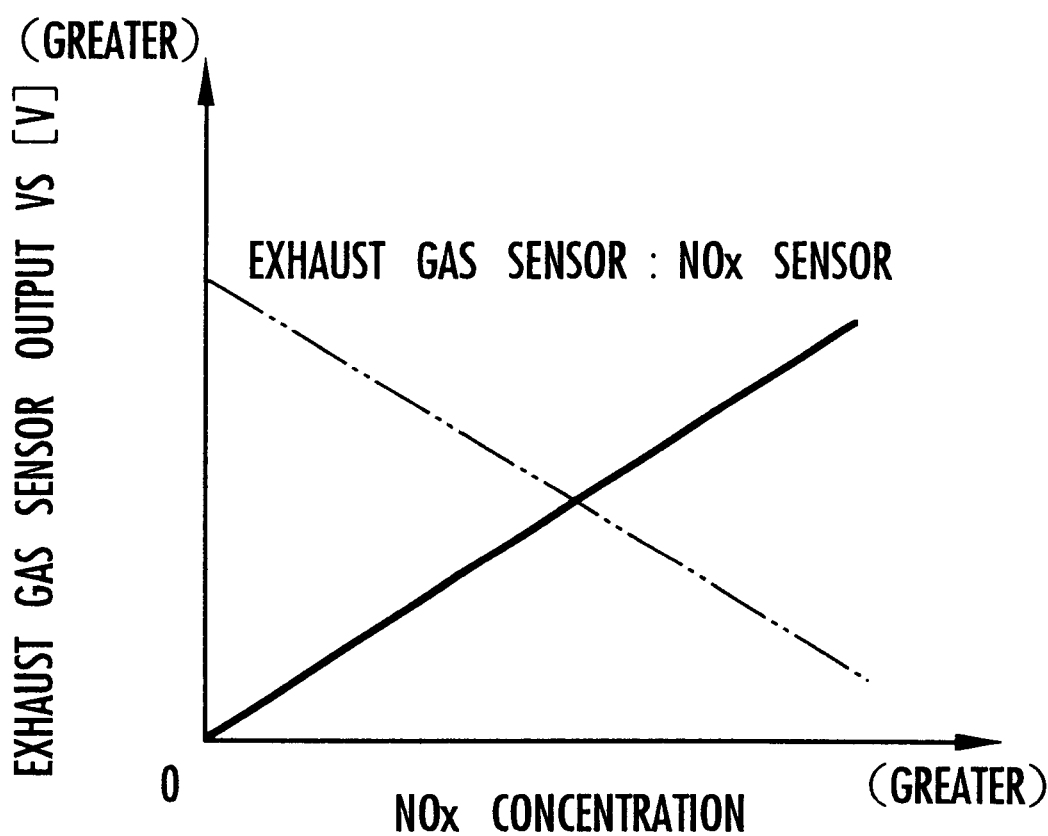
FIG. 2 is a diagram showing the output of an exhaust gas sensor (NOx sensor) used by the control apparatus shown in FIG. 1 depending on the concentration of NOx detected thereby.

Some NOx sensors have negative characteristics such that the output thereof has a level which decreases linearly as the NOx concentration increases, i.e., substantially in inverse proportion to the NOx concentration, as indicated by the imaginary-line curve in FIG. 2. In the illustrated embodiment, however, the exhaust gas sensor 5 has positive characteristics as indicated by the solid-line curve in FIG. 2.

The control apparatus according the present embodiment basically performs a control process of manipulating the air-fuel ratio of the engine 1 in order to maximize the purification rate at which NOx is purified by the catalytic converter 3 irrespective of the deteriorated state of the catalytic converter 3, or stated otherwise, in order to minimize the NOx concentration represented by the output VS of the exhaust gas sensor 5, i.e., the concentration of NOx purified by the catalytic converter 3.

For performing the control process described above, the control apparatus has a target air-fuel ratio calculating controller 6 as a target air-fuel ratio calculating means for sequentially calculating a target air-fuel ratio KCMD of the engine 1, which is also a target value of the output KACT of the LAF sensor 4, to minimize the NOx concentration represented by the output VS of the exhaust gas sensor 5, using sampled data of the output KACT of the LAF sensor 4 and the output VS of the exhaust gas sensor 5, and a fuel supply controller 7 as an air-fuel ratio manipulating means for manipulating the air-fuel ratio of the engine 1 by adjusting the quantity of fuel supplied to the engine 1, i.e., the quantity of fuel injected into the engine 1, in order to converge the output KACT of the LAF sensor 4, i.e., the detected value of the air-fuel ratio of the engine 1, to the target air-fuel ratio KCMD determined by the target air-fuel ratio calculating controller 6.

The target air-fuel ratio calculating controller 6 includes a function as an identifying means 8. The fuel supply controller 7 is supplied with the output KACT of the LAF sensor 4, the output VS of the exhaust gas sensor 5, and also detected output signals from various other sensors for detecting a engine speed, an intake pressure (a pressure in an intake pipe), a coolant temperature, etc. of the engine 1.

The controllers 6, 7 comprise a microcomputer, and perform their respective control processes in given control cycles. In the present embodiment, each of the control cycles in which the fuel supply controller 7 performs its process of adjusting the fuel injection quantity has a period in synchronism with a crankshaft angle period (so-called TDC) of the engine 1. Each of the control cycles in which the target air-fuel ratio calculating controller 6 calculates a target air-fuel ratio has a predetermined period longer than the crankshaft angle period.

Prior to describing the controllers 6, 7, the characteristics of purification of NOx by the catalytic converter 3 will be described below.

Figure 3:
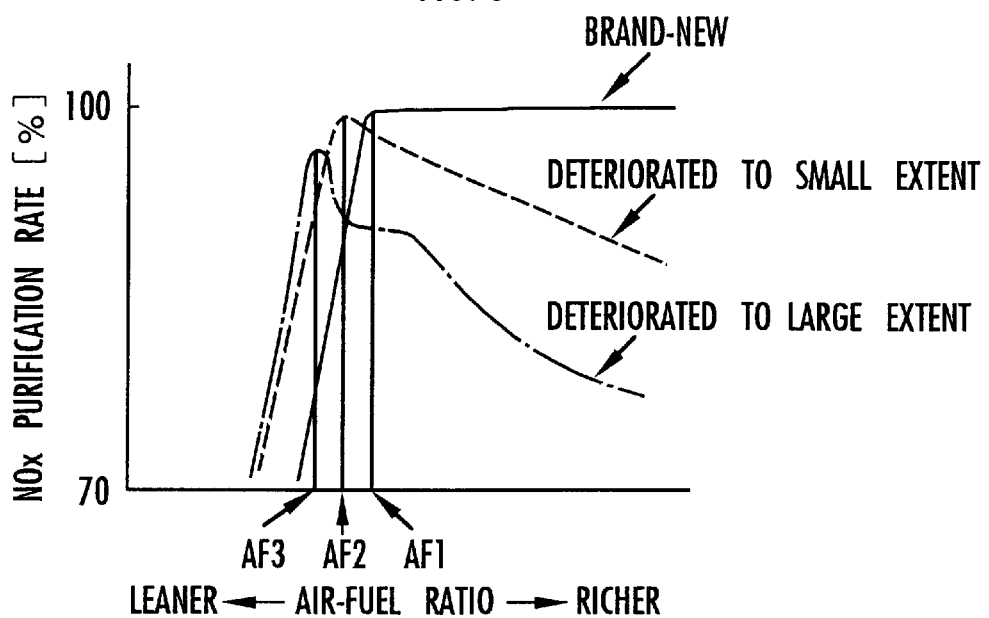
FIG. 3 is a diagram showing the capabilities of the catalytic converter of the control apparatus shown in FIG. 1 to purify NOx.

The catalytic converter 3 basically has the characteristics of purification of NOx, i.e., the characteristics of the purification rate of NOx, with respect to changes in the air-fuel ratio of the engine 1, as shown in FIG. 3. Specifically, a solid-line curve shown in FIG. 3 represents a brand-new catalytic converter 3, and brokenline and dot-and-dash-line curves shown in FIG. 3 represent deteriorated catalytic converters 3. More specifically, the broken-line curve represents a catalytic converter 3 which is deteriorated to a relatively small extent, and the dot-and-dash-line curve represents a catalytic converter 3 which is deteriorated to a relatively large extent.

As indicated by the solid-line curve in FIG. 3, the purification rate of NOx by the brand-new catalytic converter 3 is of a substantially constant maximum level (substantially 100%) when the air-fuel ratio of the engine 1 is in an air-fuel ratio range richer than a certain value AF1, and sharply drops when the air-fuel ratio of the engine 1 is in an air-fuel ratio range leaner than the value AF1.

When the catalytic converter 3 is deteriorated to a certain extent, as indicated by the broken-line and dot-and-dash-line curves in FIG. 3, the purification rate of NOx has a maximum value, i.e., a peak, at a certain air-fuel ratio AF2 (the broken-line curve) or a certain air-fuel ratio AF3 (the dot-and-dash-line curve). Furthermore, the purification rate of NOx decreases when the air-fuel ratio of the engine 1 changes to a richer range or a leaner range from the air-fuel ratio AF2 or AF3 which corresponds to the maximum purification rate of NOx. The reduction from the maximum value of the purification rate of NOx is relatively sharp, i.e., the gradient of the curves is large, in the leaner air-fuel ratio range, and is relatively gradual, i.e., the gradient of the curves is small, in the richer air-fuel ratio range. The maximum value of the purification rate of NOx when the catalytic converter 3 is deteriorated is smaller than the maximum value of the purification rate of NOx when the catalytic converter 3 is brand-new. The maximum value of the purification rate of NOx becomes smaller as the catalytic converter 3 is progressively deteriorated.

Therefore, the purification rate of NOx purified by the catalytic converter 3 has such characteristics that it basically has a maximum value as the air-fuel ratio of the engine 1 changes, except when the catalytic converter 3 is brand-new.

In the various deteriorated states of the catalytic converter 3, including the brand-new state of the catalytic converter 3, the purification rate of other components than NOx purified by the catalytic converter 3, e.g., the purification rate of HC (described later on in another embodiment), is also approximately maximum at the air-fuel ratios AF1, AF2, AF3 where the purification rate of NOx is maximum. Those air-fuel ratios AF1, AF2, AF3 are basically shifted into the leaner air-fuel ratio range as the deterioration of the catalytic converter 3 progresses. Furthermore, the purification rate of NOx changes sharply, i.e., the curves of the purification rate of NOx become convex more sharply, in the vicinity of the air-fuel ratios AF1, AF2, AF3 basically as the deterioration of the catalytic converter 3 progresses.

In view of those purification characteristics of the catalytic converter 3, the characteristics of the output VS of the exhaust gas sensor 5 (NOx sensor) with respect to changes in the air-fuel ratio of the engine 1 will be described below. The characteristics of the purification rate achieved by the catalytic converter 3 and the output VS of the exhaust gas sensor 5 with respect to the air-fuel ratio of the engine 1 will also be referred to as "air-fuel ratio-related characteristics".

Figure 4:
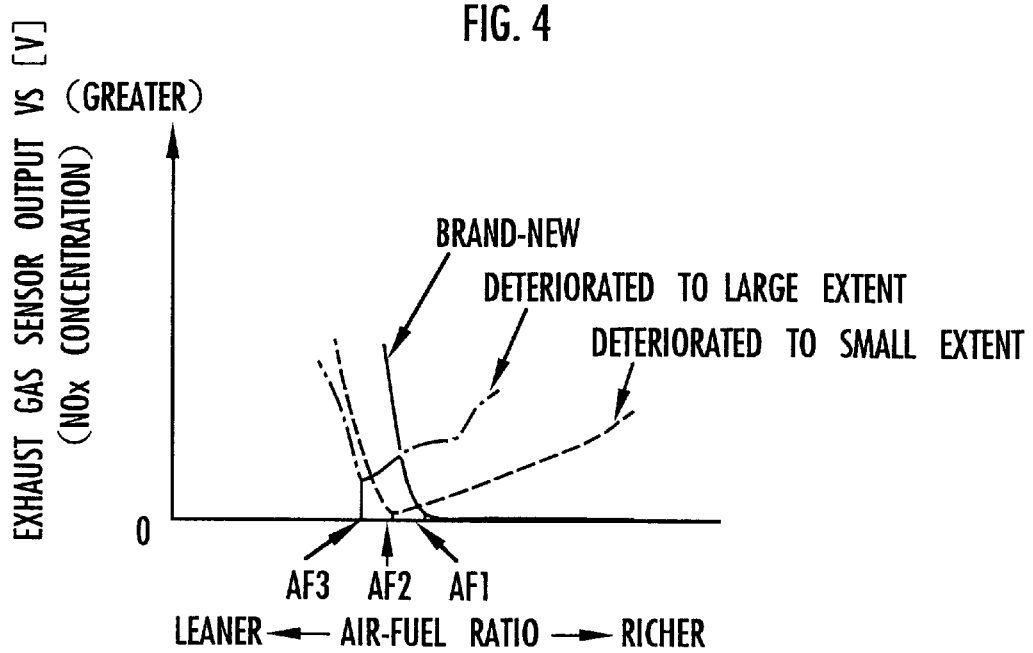
FIG. 4 is a diagram showing the output of the exhaust gas sensor (NOx sensor) used by the control apparatus shown in FIG. 1 or the concentration of NOx detected by the exhaust gas sensor depending on the air-fuel ratio.

Since the catalytic converter 3 has the above NOx purification characteristics, the NOx concentration detected by the exhaust gas sensor 5 (NOx sensor) downstream of the catalytic converter 3, i.e., the NOx concentration of the exhaust gas that has been purified by the catalytic converter 3, is basically of such characteristics representing a vertical reversal of the characteristic curves shown in FIG. 3, with respect to changes in the air-fuel ratio of the engine 1, as shown in FIG. 4. Accordingly, the air-fuel ratio-related characteristics of the NOx concentration basically have minimum values as indicated by the broken-line and dot-and-dash-line concave curves in FIG. 4, except when the catalytic converter 3 is brand-new as represented by the solid-line curve shown in FIG. 4.

Because the output characteristics of the exhaust gas sensor 5 with respect to the NOx concentration are positive characteristics as described above, the air-fuel ratio-related characteristics of the output VS of the exhaust gas sensor 5 are also the same as the characteristics of the NOx concentration shown in FIG. 4. Specifically, the air-fuel ratio-related characteristics of the output VS of the exhaust gas sensor 5, except when the catalytic converter 3 is brand-new, or when the catalytic converter 3 is somewhat deteriorated, are such that the output VS of the exhaust gas sensor 5 has minimum values as indicated by the concave curves in FIG. 4 at the air-fuel ratios AF2, AF3 of the engine 1 where the purification rate of NOx by the catalytic converter 3 is maximum, as indicated by the broken-line and dot-and-dash-line curves in FIG. 4. When the catalytic converter 3 is brand-new, as indicated by the solid-line curve in FIG. 4, in an air-fuel ratio range richer than the air-fuel ratio AF1, i.e., in an air-fuel ratio range where the purification rate of NOx is kept at a substantially constant maximum level (about 100%), the output VS of the exhaust gas sensor 5 is kept at a substantially constant minimum level (about 0 V). When the air-fuel ratio of the engine 1 changes to a value leaner than the value AF1, the output VS of the exhaust gas sensor 5 increases sharply.

Based on the purification characteristics of the catalytic converter 3 and the air-fuel ratio-related characteristics of the output VS of the exhaust gas sensor 5 (NOx sensor), the target air-fuel ratio calculating controller 6 and the fuel supply controller 7 will be described below.

The target air-fuel ratio calculating controller 6 calculates the target air-fuel ratio KCMD of the engine 1 to minimize the output VS of the exhaust gas sensor 5 or the NOx concentration recognized from the output VS of the exhaust gas sensor 5, i.e., the detected value of the NOx concentration, or stated otherwise, the target air-fuel ratio KCMD to maximize the purification rate of NOx by the catalytic converter 3, according to the following algorithm:

In the present embodiment, the air-fuel ratio-related characteristics of the output VS of the exhaust gas sensor 5 are approximately expressed by a quadratic function as a nonlinear function, or stated essentially equivalently, the air-fuel ratio-related characteristics of the NOx concentration detected by the exhaust gas sensor 5 are approximately expressed by a quadratic function. The target air-fuel ratio calculating controller 6 sequentially identifies parameters that determine the graphic presentation of the quadratic function, i.e., the coefficients of terms of different degrees and the values of constant terms of the quadratic function, in each control cycle of the target air-fuel ratio calculating controller 6, using sampled data of the output KACT (the detected value of the air-fuel ratio of the engine 1) of the LAF sensor 4 and the output VS of the exhaust gas sensor 5. Furthermore, the target air-fuel ratio calculating controller 6 sequentially determines the target air-fuel ratio KCMD of the engine 1 according to the quadratic function with the identified values of the parameters.

More specifically, the quadratic function which approximately expresses the air-fuel ratio-related characteristics of the output VS of the exhaust gas sensor 5 is given as a quadratic function having an independent variable represented by the output KACT of the LAF sensor 4 which indicates the detected value of the air-fuel ratio of the engine 1 and a dependent variable represented by the output VS of the exhaust gas sensor 5. In order to express the quadratic function as an equation, instead of directly using the output KACT of the LAF sensor 4 (the detected value of the air-fuel ratio) as the independent variable, the difference kact (=KACT−FLAF/BASE, hereinafter referred to as "differential air-fuel ratio kact") between the output KACT and a predetermined reference value FLAF/BASE (hereinafter referred to as "air-fuel ratio reference value FLAF/BASE") is used, and the quadratic function is defined according to the equation (1) shown below. In the present embodiment, the air-fuel ratio reference value FLAF/BASE is represented by a stoichiometric air-fuel ratio, for example.

$$VSH1 = a1 \cdot (KACT - FLAF/BASE)^2 + b1 \cdot (KACT - FLAF/BASE) + c1 = a1 \cdot kact^2 + b1 \cdot kact + c1 \quad (1)$$

where kact=KACT−FLAF/BASE.

In the equation (1), in order to distinguish the function value (the calculated value of the right side of the equation (1)) which is the value of the dependent variable of the quadratic function from the actual output VS of the exhaust gas sensor 5, the output of the exhaust gas sensor 5 as the dependent variable of the quadratic function is denoted by "VSH1" rather than "VS". In the description given below, the output of the exhaust gas sensor 5 denoted by "VSH1" is referred to as "function output VSH1".

In the equation (1) of the quadratic function, the coefficient a1 of the term "$kact^2$" of second degree, the coefficient b1 of the term "kact" of first degree, and the constant term c1 are parameters whose values are to be identified by the function as the identifying means 8 of the target air-fuel ratio calculating controller 6. The identifying means 8 of the target air-fuel ratio calculating ing controller 6 identifies the values of the above parameters a1, b1, c1 according to a sequential identifying algorithm that is constructed as follows:

According to the sequential identifying algorithm, in each control cycle of the target air-fuel ratio calculating controller 6, a function output VSH1(k) of the exhaust gas sensor 5 in each control cycle is determined according to the equation (2) given below, using a differential air-fuel ratio kact(k) produced by subtracting the air-fuel ratio reference value FLAF/BASE from a present value KACT(k) of the output of the LAF sensor 4 (k represents the ordinal number of a control cycle) and present identified values a1(k), b1(k), c1(k) of the parameters a1, b1, c1, which are basically the identified values of the parameters a1, b1, c1 determined in a preceding control cycle.

$$VSH1(k) = a1(k) \cdot kact(k)^2 + b1(k) \cdot kact(k) + c1(k) = \Theta1^T(k) \cdot \xi1(k) \quad (2)$$

where $\Theta1^T(k) = [a1(k) \, b1(k) \, c1(k)]$ $\xi1^T(k) = [(kact(k)^2 \, kact(k) \, 1]$ In the equation (2), $\Theta1$, $\xi1$ represent vectors defined therein, and T represents a transposition.

An identified error ID/E1(k) given as the difference between the function output VSH1(k) and an actual output VS(k) of the exhaust gas sensor 5 in the present control cycle is determined according to the following equation (3):

$$ID/E1(k) = VS(k) - VSH1(k) \quad (3)$$

The sequential identifying algorithm that is carried out by the identifying means 8 of the target air-fuel ratio calculating controller 6 determines new identified values a1(k+1), b1(k+1), c1(k+1) of the parameters a1, b1, c1, or stated otherwise a new vector $\Theta1(k+1)$ having these new identified values as its components (hereinafter referred to as "identified parameter vector $\Theta1$"), in order to minimize the identified error ID/E1. The new identified parameter vector $\Theta1$ is calculated, i.e., the identified values of the parameters a1, b1, c1 are updated, according to the following equation (4):

$$\Theta1(k+1) = \Theta1(k) + Kp1(k) \cdot ID/E1(k) \quad (4)$$

Specifically, the identified values a1(k+1), b1(k+1), c1(k+1) of the parameters a1, b1, c1 are determined by changing the present identified values a1(k), b1(k), c1(k) of the parameters a1, b1, c1, which are the identified values determined in the preceding control cycle, by a quantity proportional to the identified error ID/E1(k) in the present control cycle.

In the equation (4), "Kp1(k)" represents a cubic vector determined according to the equation (5) given below in each control cycle, and determines a rate of change (gain) of the identified values of the parameters a1, b1, c1 depending on the identified error ID/E1.

$$Kp1(k) = \frac{P1(k) \cdot \xi 1(k)}{1 + \xi 1^T(k) \cdot P1(k) \cdot \xi 1(k)} \quad (5)$$

where P1(k) represents a cubic square matrix updated in each control cycle by a recursive formula expressed by the following equation (6):

$$P1(k+1) = \frac{1}{\lambda 1} \cdot \left( I - \frac{\lambda 2 \cdot P1(k) \cdot \xi 1(k) \cdot \xi 1^T(k)}{\lambda 1 + \lambda 2 \cdot \xi 1^T(k) \cdot P1(k) \cdot \xi 1(k)} \right) \cdot P1(k) \quad (6)$$

where I represents a unit matrix, an initial value P1(0) of the matrix P1(k) represents a diagonal matrix whose each diagonal component is a positive number, and λ1, λ2 are established to satisfy the conditions 0<λ1≦1 and 0≦λ2<2.

Depending on how λ1, λ2 in the equation (6) are established, any one of various specific identifying algorithms including a sequential method of least squares, a sequential method of weighted least squares, a fixed gain method, a degressive gain method, etc. may be employed. According to the present embodiment, an identifying algorithm according to a sequential method of least squares (λ1=λ2=1), for example, is employed.

The algorithm described above is the sequential identifying algorithm to identify the values of the parameters, a1, b1, c1 of the quadratic function.

In the present embodiment, an additional process of limiting the identified value of the parameter a1 which is the coefficient of the term of second degree of the quadratic function is performed in identifying the values of the parameters a1, b1, c1. Such an additional process will be described later on.

Then, the target air-fuel ratio calculating controller 6 determines in each control cycle a target air-fuel ratio KCMD of the engine 1, which is also a target value of the air-fuel ratio detected by the LAF sensor 4, using the quadratic function with the values of the parameters a1, b1, c1 thereof being identified as described above.

More specifically, when the values of the parameters a1, b1, c1 of the quadratic function are identified as described above, the graphic presentation of the quadratic function determined by the identified values approximates the graphic presentation of the air-fuel ratio-related characteristics of the output VS of the exhaust gas sensor 5. At this time, since the air-fuel ratio-related characteristics of the output VS of the exhaust gas sensor 5 are basically characteristics having minimum values, i.e., characteristics represented by concave curves, as described above, the graphic presentation of the quadratic function determined by the identified values of the parameters a1, b1, c1 are also characteristics having minimum values.

Figure 5:
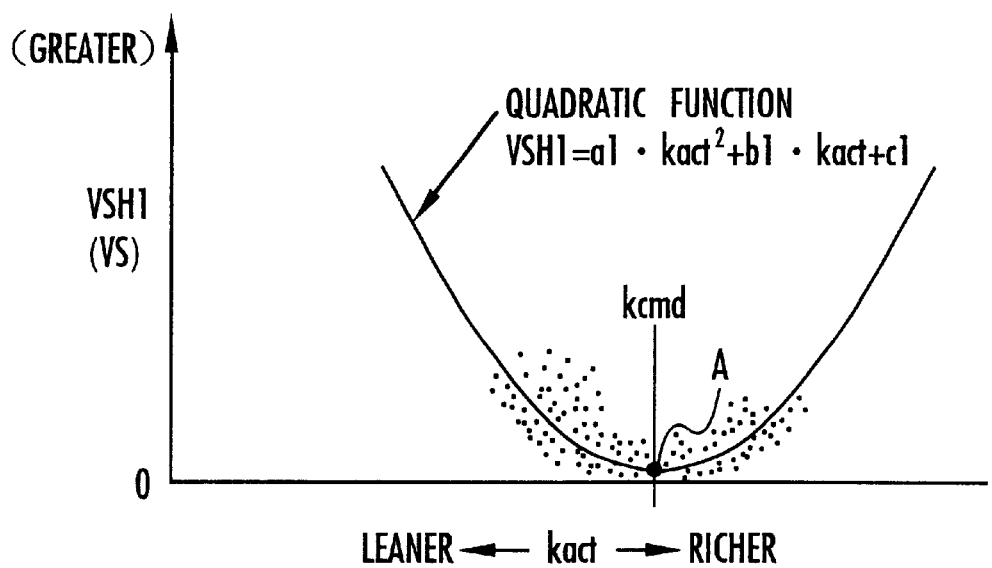
FIG. 5 is a diagram illustrative of the processing of a target air-fuel ratio calculating controller in the control apparatus shown in FIG. 1.

For example, sampled data of the output VS of the exhaust gas sensor 5 and the differential air-fuel ratio kact (=KACT−FLAF/BASE) according to the LAF sensor 4 are obtained with a tendency indicated by dots in FIG. 5 when the catalytic converter 3 is in a certain deteriorated state. At this time, the graph of the quadratic function determined by the identified values of the parameters a1, b1, c1 is of a concave shape as indicated by the solid-line curve in FIG. 5.

In the present embodiment, basically, the air-fuel ratio of the engine 1 which minimizes the output VS of the exhaust gas sensor 5, i.e., the air-fuel ratio which minimizes the NOx concentration recognized from the output VS of the exhaust gas sensor 5, is determined as the target air-fuel ratio KCMD.

The target air-fuel ratio calculating controller 6 basically determines the value of the differential air-fuel ratio kact which minimizes the function value (the function output VSHl) of the above quadratic function, i.e., the value of the differential air-fuel ratio kact at a point A in FIG. 5, as a target value of the difference between the air-fuel ratio detected by the LAF sensor 4 and the air-fuel ratio reference value FLAF/BASE, i.e., the difference between the target air-fuel ratio KCMD and the air-fuel ratio reference value FLAF/BASE (=KCMD−FLAF/BASE, hereinafter referred to as "target differential air-fuel ratio kcmd").

The target differential air-fuel ratio kcmd can be determined using the identified values of the parameters a1, b1, specifically, latest identified values a1(k+1), b1(k+1) thereof, among the parameters a1, b1, c1 of the quadratic function, according to the following equation (7):

$$kcmd = -\frac{b1}{2 \cdot a1} \quad (7)$$

The target air-fuel ratio calculating controller 6 basically adds the air-fuel ratio reference value FLAF/BASE to the target differential air-fuel ratio kcmd determined according to the equation (7), thus determining the target air-fuel ratio KCMD in each control cycle.

As described above, when the catalytic converter 3 is brand-new, the air-fuel ratio-related characteristics of the output VS of the exhaust gas sensor 5 have no minium value. In this case, sampled data of the output VS of the exhaust gas sensor 5 and the differential air-fuel ratio kact (=KACT−FLAF/BASE) are obtained with a tendency indicated by dots in FIG. 6. At this time, the graph of the quadratic function determined by the identified values of the parameters a1, b1, c1 is given as indicated by the solid-line curve in FIG. 6.

In this case, if the value of the differential air-fuel ratio kact corresponding to the minimum value of the function value of the quadratic function is determined as the target differential air-fuel ratio kcmd, then the target air-fuel ratio KCMD produced by adding the air-fuel ratio reference value FLAF/BASE to the target differential air-fuel ratio kcmd is of a value in an air-fuel ratio range in which the output VS of the exhaust gas sensor 5 is kept at a substantially constant level, i.e., the purification rate of NOx by the catalytic converter 3 is kept at a substantially constant maximum level (substantially 100%)

The target air-fuel ratio KCMD of such a value does not pose problems in maintaining a desired NOx purification capability, but generally tends to lower the purification rates of other gas components by the catalytic converter 3. For example, as described in detail later on with respect to another embodiment, the purification rate of HC by the catalytic converter 3 which is brand-new is at a substantially constant maximum level in an air-fuel ratio range leaner than a value that is substantially equal to the air-fuel ratio AF1 in FIG. 3, and drops in an air-fuel ratio range richer than that value.

If the catalytic converter 3 is brand-new and the air-fuel ratio-related characteristics of the output VS of the exhaust gas sensor 5 have no minimum value, the minimum value of the quadratic function determined by the identified values of the parameters a1, b1, c1 is a negative value which the actual output VS of the exhaust gas sensor 5 cannot take, i.e., a value smaller than the output VS of the exhaust gas sensor 5 when the NOx concentration is substantially "0".

Figure 6:
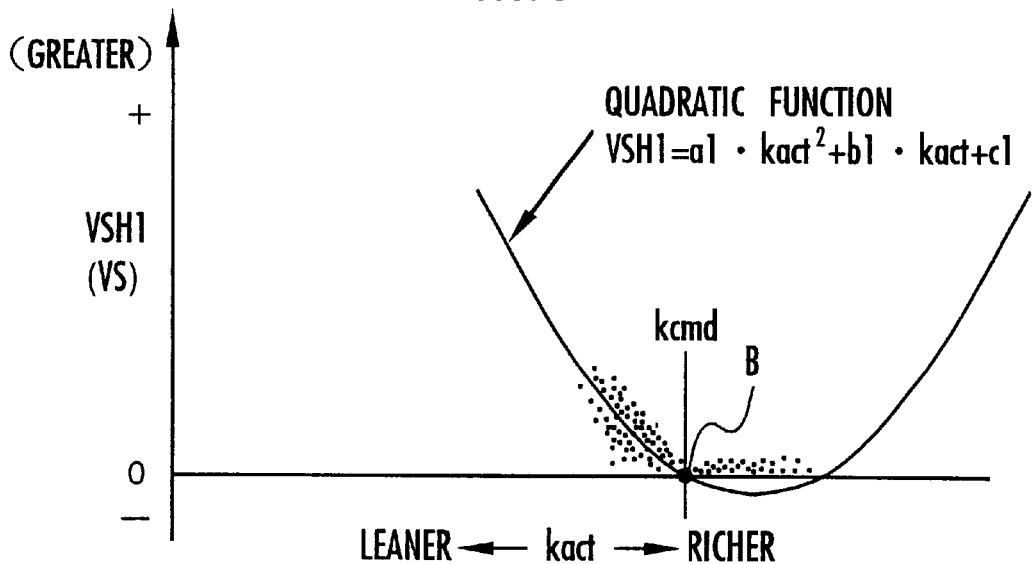
FIG. 6 is a diagram illustrative of the processing of the target air-fuel ratio calculating controller in the control apparatus shown in FIG. 1.

According to the present embodiment, therefore, if the minimum value of the quadratic function determined by the identified values of the parameters a1, b1, c1 is a negative value, then the target air-fuel ratio calculating controller 6 determines one of two values of the differential air-fuel ratio kact at which the function value of the quadratic function (the function output VSH1 of the exhaust gas sensor 5) is "0", which one of the two values is in the leaner air-fuel ratio range (the value of the differential air-fuel ratio kact at a point B in FIG. 6), as the target differential air-fuel ratio kcmd.

The minimum value of the quadratic function becomes negative if the identified values of the parameters a1, b1, c1 satisfy the inequality: $b1^2 - 4 \cdot a1 \cdot c > 0$. The target differential air-fuel ratio kcmd in this case is determined using the identified values of the parameters a1, b1, c1, specifically, latest identified values a1(k+1), b1(k+1), c1(k+1) thereof, according to the following equation (8):

$$kcmd = \frac{-b1 - \sqrt{b1^2 - 4 \cdot a1 \cdot c1}}{2 \cdot a1} \quad (8)$$

If the minimum value of the quadratic function is "0" or a positive value, then the value of the differential air-fuel ratio kact corresponding to the minimum value of the quadratic function is determined as the target differential air-fuel ratio kcmd.

Specifically, according to the present embodiment, the target air-fuel ratio calculating controller 6 determines, in each control cycle, the target differential air-fuel ratio kcmd(k) depending on the value of a criterion formula ($b1^2 - 4 \cdot a1 \cdot c1$) determined by the identified values a1(k+1), b1(k+1), c1(k+1) of the parameters a1, b1, c1 of the quadratic function that have been determined by the identifying means 8 as described above, according to the following equations (9):

When $b1^2 - 4 \cdot a1 \cdot c1 \leq 0$, $$kcmd = -\frac{b1}{2 \cdot a1} \quad (9)$$

When $b1^2 - 4 \cdot a1 \cdot c1 > 0$, $$kcmd = \frac{-b1 - \sqrt{b1^2 - 4 \cdot a1 \cdot c1}}{2 \cdot a1}$$

(a1=a1(k+1), b1=b1(k+1), c1=(k+1))

Then, the target air-fuel ratio calculating controller 6 determines the target air-fuel ratio KCMD(k) in each control cycle by adding the air-fuel ratio reference value FLAF/BASE to the target differential air-fuel ratio kcmd(k) thus determined, according to the following equation (10):

$$KCMD=kcmd+FLAF/BASE \quad (10)$$

The above process is the basic process performed by the target air-fuel ratio calculating controller 6.

The fuel supply controller 7 will be described below.

Figure 7:
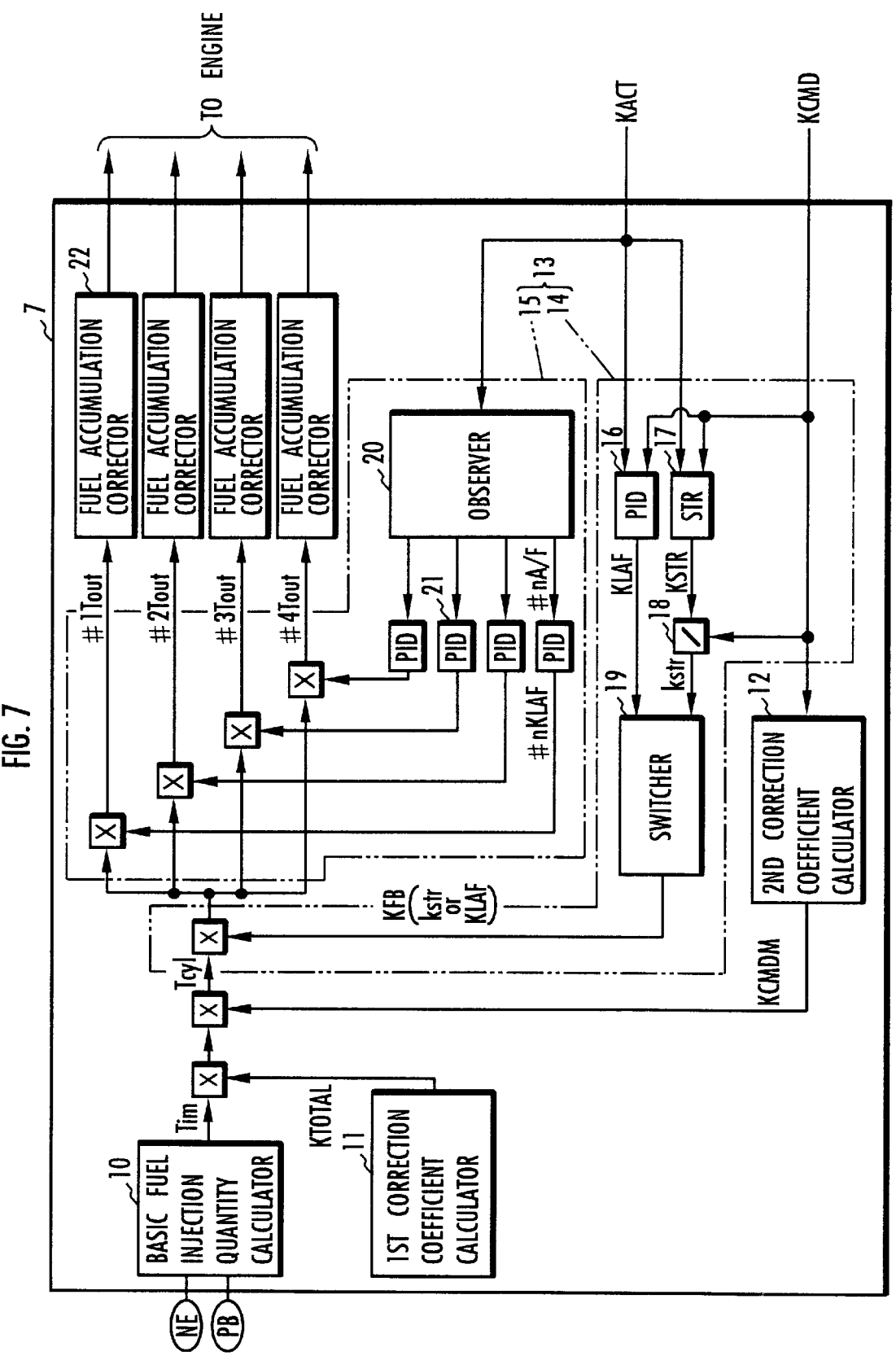
FIG. 7 is a block diagram of a basic arrangement of a fuel supply controller of the control apparatus shown in FIG. 1.

As shown in FIG. 7, the fuel supply controller 7 has, as its functions, a basic fuel injection quantity calculator 10 for determining a basic fuel injection quantity Tim to be injected into the engine 1, a first correction coefficient calculator 11 for determining a first correction coefficient KTOTAL to correct the basic fuel injection quantity Tim, and a second correction coefficient calculator 12 for determining a second correction coefficient KCMDM to correct the basic fuel injection quantity Tim.

The basic fuel injection quantity calculator 10 determines a reference fuel injection quantity (fuel supply quantity) for the engine 1 from the rotational speed NE and intake pressure PB of the engine 1 using a predetermined map, and corrects the determined reference fuel injection quantity depending on the effective opening area of a throttle valve (not shown) of the engine 1, thereby calculating a basic fuel injection quantity Tim.

The first correction coefficient KTOTAL determined by the first correction coefficient calculator 11 serves to correct the basic fuel injection quantity Tim in view of an exhaust gas recirculation ratio of the engine 1, i.e., the proportion of an exhaust gas contained in an air-fuel mixture introduced into the engine 1, an amount of purged fuel supplied to the engine 1 when a canister (not shown) is purged, a coolant temperature, an intake temperature, etc. of the engine 1.

The second correction coefficient KCMDM determined by the second correction coefficient calculator 12 serves to correct the basic fuel injection quantity Tim in view of the charging efficiency of an air-fuel mixture due to the cooling effect of fuel flowing into the engine 1 depending on a target air-fuel ratio KCMD generated by the target air-fuel ratio calculating controller 6.

The fuel supply controller 7 corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 or U.S. Pat. No. 5,253,630, and will not be described below.

The fuel supply controller 7 also has, in addition to the above functions, a feedback controller 13 for adjusting a fuel injection quantity for the engine 1 according to a feedback control process so as to converge the output KACT of the LAF sensor 4 toward the target air-fuel ratio KCMD which is sequentially generated by the exhaust system controller 6.

The feedback controller 13 comprises a general feedback controller 14 for controlling a total air-fuel ratio for the cylinders of the engine 1 and a local feedback controller 15 for feedback-controlling an air-fuel ratio for each of the cylinders of the engine 1.

The general feedback controller 14 sequentially determines a feedback correction coefficient KFB to correct the demand fuel injection quantity Tcyl (by multiplying the demand fuel injection quantity Tcyl) so as to converge the output KACT from the LAF sensor 4 toward the target air-fuel ratio KCMD.

The general feedback controller 14 comprises a PID controller 16 for generating a feedback manipulated variable KLAF as the feedback correction coefficient KFB depending on the difference between the output KACT from the LAF sensor 4 and the target air-fuel ratio KCMD according to a known PID control process, and an adaptive controller 17 (indicated by "STR" in FIG. 8) for adaptively determining a feedback manipulated variable KSTR for determining the feedback correction coefficient KFB in view of changes in operating conditions of the engine 1 and characteristic changes es thereof from the output KACT from the LAF sensor 4 and the target air-fuel ratio KCMD.

In the present embodiment, the feedback manipulated variable KLAF generated by the PID controller 16 is of "1" and can be used directly as the feedback correction coefficient KFB when the output KACT (the detected air-fuel ratio of then engine 1) from the LAF sensor 4 is equal to the target air-fuel ratio KCMD. The feedback manipulated variable KSTR generated by the adaptive controller 17 becomes the target air-fuel ratio KCMD when the output KACT from the LAF sensor 4 is equal to the target air-fuel ratio KCMD. A feedback manipulated variable kstr (=KSTR/KCMD) which is produced by dividing the feedback manipulated variable KSTR by the target air-fuel ratio KCMD with a divider 18 can be used as the feedback correction coefficient KFB.

The feedback manipulated variable KLAF generated by the PID controller 16 and the feedback manipulated variable kstr which is produced by dividing the feedback manipulated variable KSTR from the adaptive controller 17 by the target air-fuel ratio KCMD are selected one at a time by a switcher 19. A selected one of the feedback manipulated variable KLAF and the feedback manipulated variable kstr is used as the feedback correction coefficient KFB. The demand fuel injection quantity Tcyl is corrected by being multiplied by the feedback correction coefficient KFB. Details of the general feedback controller 14 (particularly, the adaptive controller 17) will be described later on.

The local feedback controller 15 comprises an observer 20 for estimating real air-fuel ratios #nA/F (n=1, 2, 3, 4) of the respective cylinders of the engine 1 from the output KACT from the LAF sensor 4, and a plurality of PID controllers 21 (as many as the number of the cylinders) for determining respective feedback correction coefficients #nKLAF for fuel injection quantities for the cylinders from the respective real air-fuel ratios #nA/F estimated by the observer 20 according to a PID control process so as to eliminate variations of the air-fuel ratios of the cylinders.

Briefly stated, the observer 20 estimates a real air-fuel ratio #nA/F of each of the cylinders as follows: A system from the engine 1 to the LAF sensor 4 (where the exhaust gases from the cylinders are combined) is considered to be a system for generating an air-fuel ratio detected by the LAF sensor 4 from a real air-fuel ratio #nA/F of each of the cylinders, and is modeled in view of a detection response delay of the LAF sensor 4 (e.g., a delay of first order) and a chronological contribution of the air-fuel ratio of each of the cylinders of the engine 1 to the air-fuel ratio detected by the LAF sensor 4. Based on the modeled system, a real air-fuel ratio #nA/F of each of the cylinders is estimated from the output KACT from the LAF sensor 4.

Details of the observer 20 are disclosed in Japanese laid-open patent publication No. 7-83094 or U.S. Pat. No. 5,531,208, for example, and will not be described below.

Each of the PID controllers 21 of the local feedback controller 15 divides the output KACT from the LAF sensor 4 by an average value of the feedback correction coefficients #nKLAF for all the cylinders determined by the respective PID controllers 21 in a preceding control cycle to produce a quotient value, and uses the quotient value as a target air-fuel ratio for the corresponding cylinder. Each of the PID controllers 21 then determines a feedback correction coefficient #nKLAF in a present control cycle so as to eliminate any difference between the target air-fuel ratio and the estimated value of the corresponding real air-fuel ratio #nA/F determined by the observer 20.

The local feedback controller 15 multiplies a value, which has been produced by multiplying the demand fuel injection quantity Tcyl by the feedback correction coefficient KFB produced by the general feedback controller 14, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the engine 1 by a fuel accumulation corrector 22 in the fuel supply controller 7. The corrected output fuel injection quantity #nTout is applied, as a command for the fuel injection quantity for each of the cylinders, to each of fuel injectors (not shown) of the engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, for example, and will not be described in detail-below.

The general feedback controller 14, particularly, the adaptive controller 17, will further be described below.

The general feedback controller 14 effects a feedback control process to converge the output KACT (detected air-fuel ratio of the engine 1) from the LAF sensor 4 toward the target air-fuel ratio KCMD as described above. If such a feedback control process were carried out under the known PID control only, it would be difficult keep stable controllability against dynamic behavioral changes including changes in the operating conditions of the engine 1, characteristic changes due to aging of the engine 1, etc.

Figure 8:
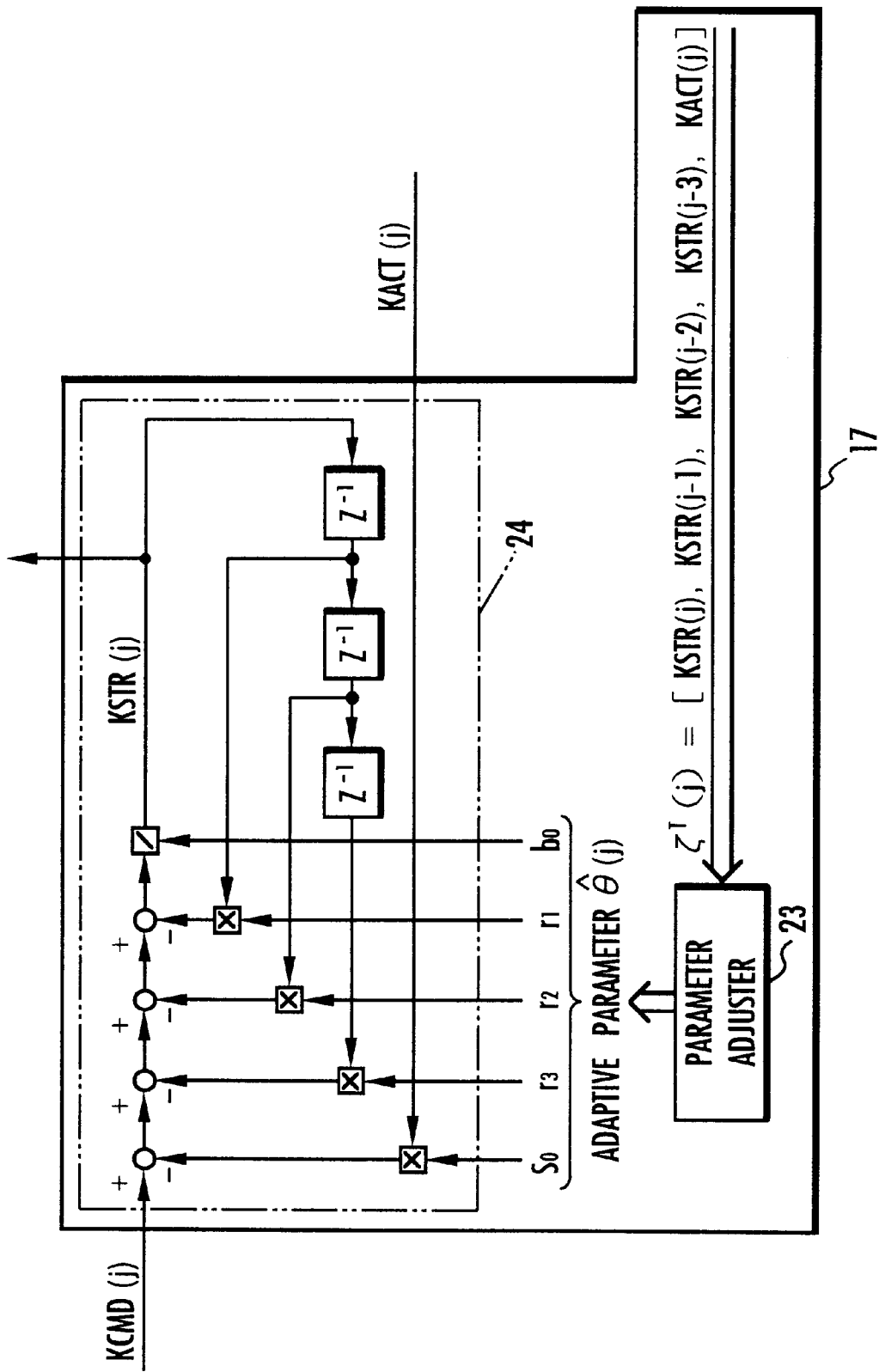
FIG. 8 is a block diagram of a basic arrangement of an adaptive controller of the fuel supply controller shown in FIG. 7.

The adaptive controller 17 is a recursive-type controller which makes it possible to carry out a feedback control process while compensating for dynamic behavioral changes of the engine 1. As shown in FIG. 8, the adaptive controller 17 comprises a parameter adjuster 23 for establishing a plurality of adaptive parameters using the parameter adjusting law proposed by I. D. Landau, et al., and a manipulated variable calculator 24 for calculating the feedback manipulated variable KSTR using the established adaptive parameters.

The parameter adjuster 23 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (11), (12), given below, an adaptive parameter θ hat (j) (j indicates the ordinal number of a control cycle) established by the parameter adjuster 23 is represented by a vector (transposed vector) according to the equation (13) given below. An input ζ(j) to the parameter adjuster 23 is expressed by the equation (14) given below. In the present embodiment, it is assumed that the engine 1, which is an object to be controlled by the general feedback controller 14, is considered to be a plant of a first-order system having a dead time dp corresponding to the time of three combustion cycles of the engine 1, and m=n=1, dp=3 in the equations (11)–(14), and five adaptive parameters s0, r1, r2, r3, b0 are established (see FIG. 8). In the upper and middle expressions of the equation (14), us, ys generally represent an input (manipulated variable) to the object to be controlled and an output (controlled variable) from the object to be controlled. In the present embodiment, the input is the feedback manipulated variable KSTR and the output from the object (the engine 1) is the output KACT (detected air-fuel ratio) from the LAF sensor 4, and the input ζ(j) to the parameter adjuster 23 is expressed by the lower expression of the equation (14) (see FIG. 8).

$$A(Z^{-1})=1+a1Z^{-1}+\ldots+anZ^{-n} \quad (11)$$

$$B(Z^{-1})=b0+b1Z^{-1}+\ldots+bmZ^{-m} \quad (12)$$

$$\hat{\theta}^T(j)=[\hat{b}0(j),\hat{B}R(Z^{-1},j),\hat{S}$$

$$(Z^{-1},j)]$$

$$=[b0(j),r1(j),\ldots,rm+dp-1(j),s0(j),\ldots,sn-1(j)]$$

$$=[b0(j), r1(j), r2(j), r3(j), s0(j)] \quad (13)$$

$$\zeta^T(j)=[us(j), \ldots, us(j-m-dp+1), ys(j), \ldots, ys(j-n+1)]$$

$$=[us(j), us(j-1), us(j-2), us(j-3), ys(j)]$$

$$=[KSTR(j), KSTR(j-1), KSTR(j-2), KSTR(j-3), KACT(j)] \quad (14)$$

The adaptive parameter θ hat expressed by the equation (13) is made up of a scalar quantity element b0 hat$^{-1}$(j) for determining the gain of the adaptive controller 17, a control element BR hat ($Z^{-1}$,j) expressed using a manipulated variable, and a control element S ($Z^{-1}$,j) expressed using a controlled variable, which are expressed respectively by the following equations (15)~(17) (see the block of the manipulated variable calculator 24 shown in FIG. 8):

$$\hat{b0}^{-1}(j) = \frac{1}{b0} \quad (15)$$

$$\hat{B}R(Z^{-1},j) = r1Z^{-1} + r2Z^{-2} + \ldots + rm + dp - 1Z^{-(n+d_P)}-1) = r1Z^{-1} + r2Z^{-2} + r3Z^{-3} \quad (16)$$

$$\hat{S}(Z^{-1},j) = s0 + s1Z^{-1} + \ldots + sn - 1Z^{-(n-1)} = s0 \quad (17)$$

The parameter adjuster 23 establishes coefficients of the scalar quantity element and the control elements, described above, and supplies them as the adaptive parameter θ hat expressed by the equation (13) to the manipulated variable calculator 24. The parameter adjuster 23 calculates the adaptive parameter θ hat so that the output KACT from the LAF sensor 4 will agree with the target air-fuel ratio KCMD, using time-series data of the feedback manipulated variable KSTR from the present to the past and the output KACT from the LAF sensor 4.

Specifically, the parameter adjuster 23 calculates the adaptive parameter θ hat according to the following equation (18):

$$\hat{\theta}(j) = \hat{\theta}(j-1) + \Gamma(j-1) \cdot \zeta(j-dp) \cdot e^*(j) \quad (18)$$

where Γ(j) represents a gain matrix (whose degree is indicated by m+n+dp) for determining a rate of establishing the adaptive parameter θ hat, and e*(j) an estimated error of the adaptive parameter θ hat. Γ(j) and e*(j) are expressed respectively by the following recursive formulas (19), (20):

$$\Gamma(j) = \frac{1}{\lambda 1(j)} \cdot \left[ \Gamma(j-1) - \frac{\lambda 2(j) \cdot \Gamma(j-1) \cdot \zeta(j-dp) \cdot \zeta(j-dp^T) \cdot \Gamma(j-1)}{\lambda 1(j) + \lambda 2(j) \cdot \zeta(j-dp^T) \cdot \Gamma(j-1) \cdot \zeta(j-dp)} \right] \quad (19)$$

where $$0 < \lambda 1(j) \leq 1, \; 0 \leq \lambda 2(j) < 2, \; \Gamma(0) > 0.$$

$$e^*(j) = \frac{D(Z^{-1}) \cdot KACT(j) - \hat{\theta}^T(j-1) \cdot \zeta(j-dp)}{1 + \zeta^T(j-dp) \cdot \Gamma(j-1) \cdot \zeta(j-dp)} \quad (20)$$

where $D(Z^{-1})$ represents an asymptotically stable polynomial for adjusting the convergence. In the present embodiment, $D(Z^{-1})$=1.

Various specific algorithms including the degressive gain algorithm, the variable gain algorithm, the fixed trace algorithm, and the fixed gain algorithm are obtained depending on how λ1(j),λ2(j) in the equation (19) are selected. For a time-dependent plant such as a fuel injection process, an air-fuel ratio, or the like of the engine 1, either one of the degressive gain algorithm, the variable gain algorithm, the fixed gain algorithm, and the fixed trace algorithm is suitable.

Using the adaptive parameter θ hat (s0, r1, r2, r3, b0) established by the parameter adjuster 23 and the target air-fuel ratio KCMD, the manipulated variable calculator 24 determines the feedback manipulated variable KSTR according to a recursive formula expressed by the following equation (21):

$$KSTR = \frac{1}{b0} \cdot [KCMD(j) - s0 \cdot KACT(j) - r1 \cdot KSTR(j-1) - r2 \cdot KSTR(j-2) - r3 \cdot KSTR(j-3)] \quad (21)$$

The manipulated variable calculator 24 shown in FIG. 8 represents a block diagram of the calculations according to the equation (21).

The feedback manipulated variable KSTR determined according to the equation (21) becomes the target air-fuel ratio KCMD insofar as the output KACT of the LAF sensor 4 agrees with the target air-fuel ratio KCMD. Therefore, the feedback manipulated variable KSTR is divided by the target air-fuel ratio KCMD by the divider 18 for thereby determining ing the feedback manipulated variable kstr that can be used as the feedback correction coefficient KFB.

As is apparent from the foregoing description, the adaptive controller 17 thus constructed is a recursive-type controller taking into account dynamic behavioral changes of the engine 1 which is an object to be controlled. Stated otherwise, the adaptive controller 17 is a controller described in a recursive form to compensate for dynamic behavioral changes of the engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 17 constructed as described above is suitable for compensating for dynamic behavioral changes of the engine 1.

The details of the adaptive controller 17 have been described above.

The PID controller 16, which is provided together with the adaptive controller 17 in the general feedback controller 14,calculates a proportional term (P term), an integral term (I term), and a derivative term (D term) from the difference between the output KACT of the LAF sensor 4 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 4 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the engine 1 using a predetermined map.

The switcher 19 of the general feedback controller 14 outputs the feedback manipulated variable KLAF determined by the PID controller 16as the feedback correction coefficient KFB for correcting the fuel injection quantity if the combustion in the engine 1 tends to be unstable as when the temperature of the coolant of the engine 1 is low, the engine 1 rotates at high speeds, or the intake pressure is low, or if the output KACT of the LAF sensor 4 is not reliable due to a response delay of the LAF sensor 4 as when the target air-fuel ratio KCMD changes largely or immediately after the air-fuel ratio feedback control process has started, or if the engine 1 operates highly stably as when it is idling and hence no high-gain control process by the adaptive controller 17 is required. Otherwise, the switcher 19 outputs the feedback manipulated variable kstr which is produced by dividing the feedback manipulated variable KSTR determined by the adaptive controller 17 by the target air-fuel ration KCMD, as the feedback correction coefficient KFB for correcting the fuel injection quantity. This is because the adaptive controller 17 effects a high-gain control process and functions to converge the output KACT of the LAF sensor 4 quickly toward the target air-fuel ratio KCMD, and if the feedback manipulated variable KSTR determined by the adaptive controller 17 is used when the combustion in the engine 1 is unstable or the output KACT of the LAF sensor 4 is not reliable, then the air-fuel ratio control process tends to be unstable.

Such operation of the switcher 19 is disclosed in detail in Japanese laid-open patent publication No. 8-105345 or U.S. Pat. No. 5,558,075, and will not be described in detail below.

Operation of the entire control apparatus according to the present embodiment will be described below.

First, a control process carried out by the fuel supply controller 7 for controlling the fuel injection quantity for the engine 1 will be described below with reference to FIGS. 9 and 10.

The fuel supply controller 7 performs the control process in control cycles in synchronism with a crankshaft angle period (TDC) of the engine 1 as follows:

The fuel supply controller 7 reads outputs from various sensors including sensors for detecting the rotational speed NE and intake pressure PB of the engine 1, the LAF sensor 4, and the exhaust gas sensor 5 in STEPa.

Then, the basic fuel injection quantity calculator 10 corrects a fuel injection quantity corresponding to the rotational speed NE and intake pressure PB of the engine 1 depending on the effective opening area of the throttle valve, thereby calculating a basic fuel injection quantity Tim in STEPb. The first correction coefficient calculator 11 calculates a first correction coefficient KTOTAL depending on the coolant temperature and the amount by which the canister is purged in STEPc.

The fuel supply controller 7 decides whether the target air-fuel ratio KCMD generated by the target air-fuel ratio calculating controller 6 is to be used or not, i.e., determines ON/OFF of an air-fuel ratio manipulating process, in order to manipulate the air-fuel ratio of the engine 1, and sets a value of a flag f/btc/on which represents ON/OFF of the air-fuel ratio manipulating process in STEPd. When the value of the flag f/btc/on is "0", it means that the target air-fuel ratio KCMD generated by the target air-fuel ratio calculating controller 6 is not to be used (OFF), and when the value of the flag f/btc/on is "1", it means that the target air-fuel ratio KCMD generated by the target air-fuel ratio calculating controller 6 is to be used (ON).

Figure 10:
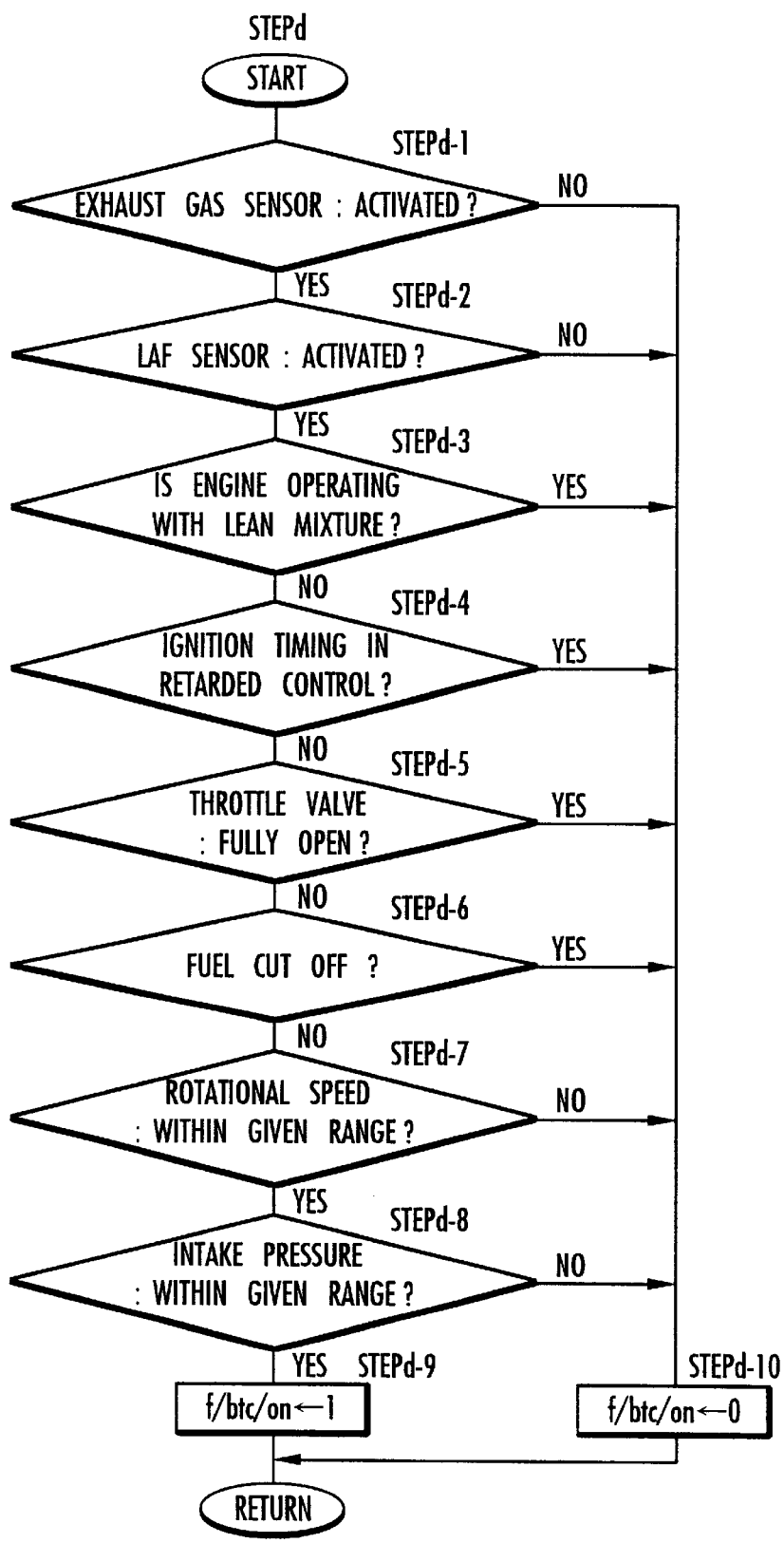
FIG. 10 is a flowchart of a subroutine of the processing sequence shown in FIG. 9.

The deciding subroutine of STEPd is shown in detail in FIG. 10. As shown in FIG. 10, the fuel supply controller 7 decides whether the exhaust gas sensor (NOx sensor) 5 is activated or not in STEPd-1 and the LAF sensor 4 is activated or not in STEPd-2. The fuel supply controller 7 decides whether these sensors are activated or not based on the output voltages thereof.

If neither one of the exhaust gas sensor 5 and the LAF sensor 4 is activated, since detected data from the sensors 5, 4 for use by the fuel supply controller 7 is not accurate enough, the value of the flag f/btc/on is set to "0" in STEPd-10.

Then, the fuel supply controller 7 decides whether the engine 1 is operating with a lean air-fuel mixture or not in STEPd-3. The fuel supply controller 7 decides whether the ignition timing of the engine 1 is retarded for early activation of the catalytic converter 3 immediately after the start of the engine 1 or not in STEPd-4. The fuel supply controller 7 decides whether the throttle valve of the engine 1 is. fully open or not in STEPd-5. The fuel supply controller 7 decides whether the supply of fuel to the engine 1 is being stopped or not in STEPd-6. If either one of the conditions of these steps is satisfied, then since it is not preferable or possible to manipulate the air-fuel ratio of the engine 1 using the target air-fuel ratio KCMD generated by the target air-fuel ratio calculating controller 6, the value of the flag f/btc/on is set to "0" in STEPd-10.

The fuel supply controller 7 then decides whether the rotational speed NE and the intake pressure PB of the engine 1 fall within respective given ranges or not respectively in STEPd-7, STEPd-8. If either one of the rotational speed NE and the intake pressure PB does not fall within its given range, then since it is not preferable or possible to manipulate the air-fuel ratio of the engine 1 using the target air-fuel ratio KCMD generated by the target air-fuel ratio calculating controller 6, the value of the flag f/btc/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied.(the engine 1 is in normal operation in these cases), then the value of the flag f/btc/on is set to "1" to use the target air-fuel ratio KCMD generated by the target air-fuel ratio calculating controller for manipulating the air-fuel ratio of the engine 1 in STEPd-9.

Figure 9:
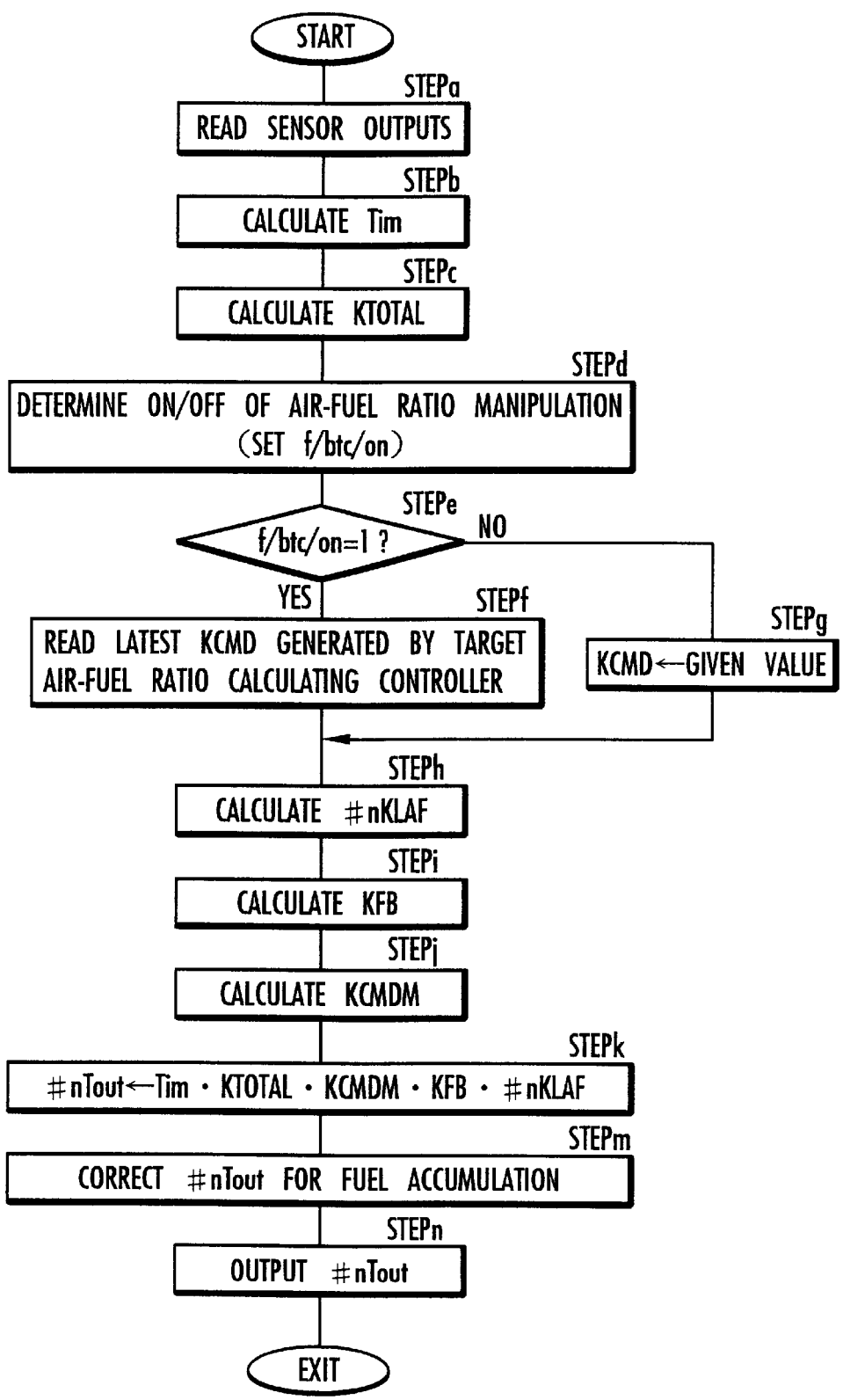
FIG. 9 is a flowchart of a processing sequence of the fuel supply controller of the control apparatus shown in FIG. 1.

In FIG. 9, after the value of the flag f/btc/on has been set as described above, the fuel supply controller 7 determines the value of the flag f/btc/on in STEPe. If f/btc/on=1, then the fuel supply controller 7 reads the latest target air-fuel ratio KCMD generated by the target air-fuel ratio calculating controller 6 in STEPf. If f/btc/on=0, then the fuel. supply controller 7 sets the target air-fuel ratio KCMD to a given value determined from the rotational speed NE and intake pressure PB of the engine 1 using a predetermined map in STEPg.

In the local feedback controller 15, the PID controllers 15 calculate respective feedback correction coefficients #nKLAF in order to eliminate variations in the air-fuel ratio between the cylinders, based on actual air-fuel ratios #nA/F of the respective cylinders which have been estimated from the output KACT of the LAF sensor 4 by the observer 20, in STEPh. Then, the general feedback controller 14 calculates a feedback correction coefficient KFB in STEPi.

Depending on the operating conditions of the engine 1, the switcher 19 selects either the feedback manipulated variable KLAF or the feedback manipulated variable kstr which has been produced by dividing the feedback manipulated variable KSTR determined by the adaptive controller 17 by the target air-fuel ratio KCMD (normally, the switcher 19 selects the feedback manipulated variable kstr). The switcher 19 then outputs the selected feedback manipulated variable KLAF or kstr as a feedback correction coefficient KFB for correcting the fuel injection quantity.

When switching the feedback correction coefficient KFB from the feedback manipulated variable KLAF from the PID controller 16 to the feedback manipulated variable kstr from the adaptive controller 17, the adaptive controller 17 determines a feedback manipulated variable KSTR in a manner to hold the correction coefficient KFB to the preceding correction coefficient KFB (=KLAF) as long as in the cycle time for the switching in order to avoid an abrupt change in the correction coefficient KFB. When switching the feedback correction coefficient KFB from the feedback manipulated variable kstr from the adaptive controller 17 to the feedback manipulated variable KLAF from the PID controller 16, the PID controller 16 calculates a present correction coefficient KLAF in a manner to regard the feedback manipulated variable KLAF determined by itself in the preceding cycle time as the preceding correction coefficient KFB (=kstr).

After having thus calculated the feedback correction coefficient KFB, the second correction coefficient calculator 12 calculates in STEPj a second correction coefficient KCMDM depending on the target air-fuel ratio KCMD determined in STEPf or STEPg.

Then, the fuel supply controller 7 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the engine 1 by the fuel accumulation correctors 22 in STEPM. The corrected output fuel injection quantities #nTout are applied to the non-illustrated fuel injectors of the engine 1 in STEPn.

In the engine 1, the fuel injectors inject fuel into the respective cylinders according to the respective output fuel injection quantities #nTout.

The above calculation of the output fuel injection quantities #nTout for the respective cylinders and control of the fuel injection of the engine 1 is carried out in successive cycles synchronous with the crankshaft angle period (TDC) of the engine 1 for controlling the air-fuel ratio of the engine 1 in order to converge the output KACT of the LAF sensor 4 toward the target air-fuel ratio KCMD. While the feedback manipulated variable kstr from the adaptive controller 17 is being used as the feedback correction coefficient KFB, the output KACT of the LAF sensor 4 is quickly converged toward the target air-fuel ratio KCMD with high stability against behavioral changes such as changes in the operating conditions of the engine 1 and characteristic changes thereof. A response delay of the engine 1 is also appropriately compensated for.

Figure 11:
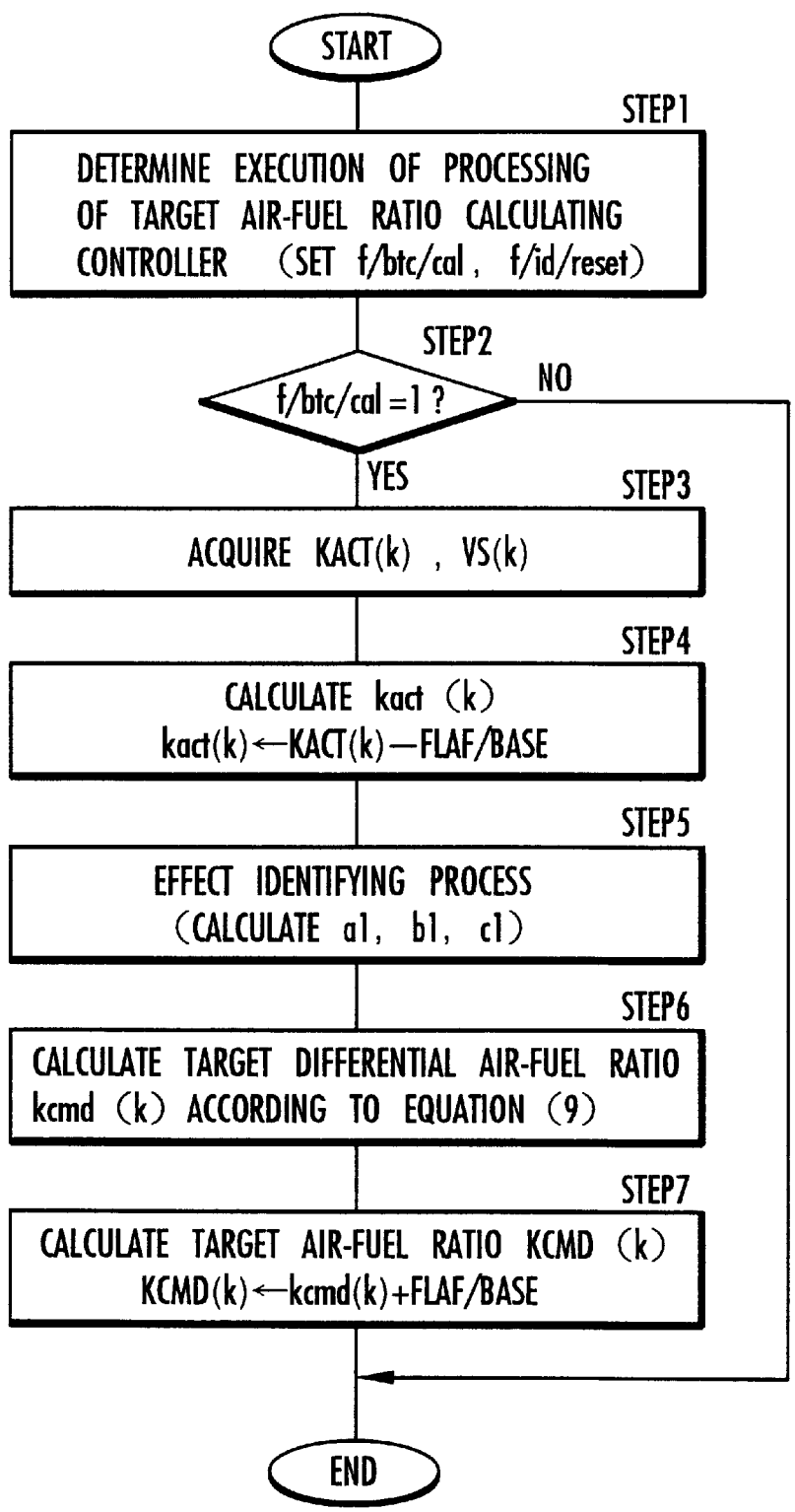
FIG. 11 is a flowchart of a processing sequence of the target air-fuel ratio calculating controller of the control apparatus shown in FIG. 1.

Concurrent with the above air-fuel ratio manipulation for the engine 1, i.e., the above control of the fuel injection quantity, the target air-fuel ratio calculating controller 6 executes a main routine shown in FIG. 11 in control cycles of a constant period.

Figure 12:
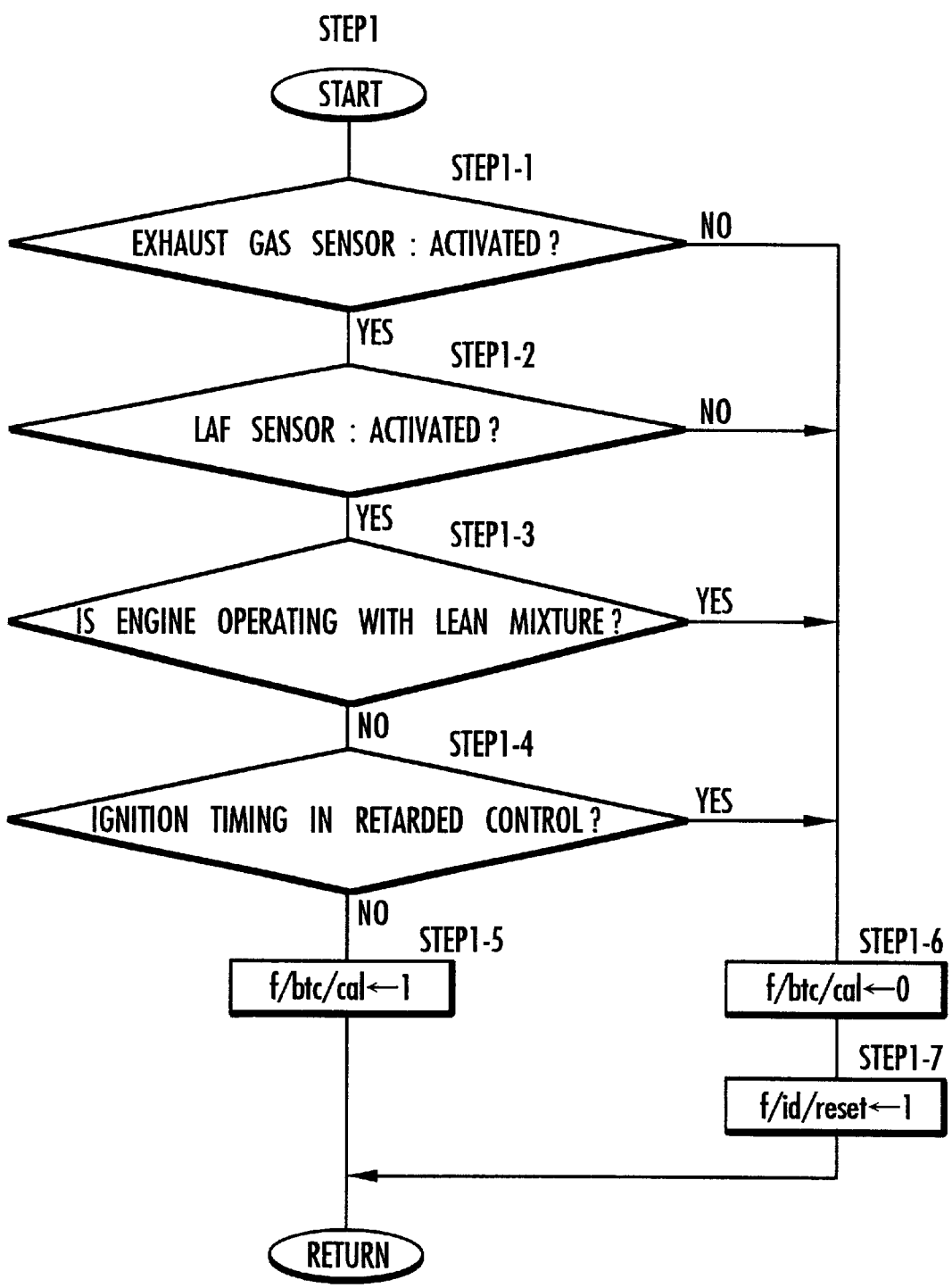
FIG. 12 is a flowchart of a subroutine of the processing sequence shown in FIG. 11.

As shown in FIG. 12, the target air-fuel ratio calculating controller 6 decides whether its own processing (the process of identifying the parameters a1, b1, c1 and the process of calculating the target air-fuel ratio KCMD) is to be executed or not, and sets a value of a flag f/btc/cal indicative of whether the processing is to be executed or not in STEP1. When the value of the flag f/btc/cal is "1", it means that the processing of the target air-fuel ratio calculating controller 6 is to be executed, and when the value of the flag f/btc/cal is "0", it means that the processing of the target air-fuel ratio calculating controller 6 is not to be executed. In STEP1, the target air-fuel ratio calculating controller 6 also sets a value of a flag f/id/reset indicative of whether an initialization, described later on, with respect to the process of identifying the parameters a1, b1, c1, is to be effected or not.

The subroutine in STEP1 is shown in detail in FIG. 12. As shown in FIG. 12, the target air-fuel ratio calculating controller 6 decides whether the exhaust gas sensor 5 is activated or not in STEP1-1 and whether the LAF sensor 4 is activated or not in STEP1-2. If neither one of the exhaust gas sensor 5 and the LAF sensor 4 is activated, since detected data from the exhaust gas sensor 5 and the LAF sensor 4 for use by the target air-fuel ratio calculating controller 6 are not accurate enough, the value of the flag f/btc/cal is set to "0" in STEP1-6.

Then, in order to perform an initialization, described later on, with respect to the process of identifying the parameters a1, b1, c1, the target air-fuel ratio calculating controller 6 sets the value of the flag f/id/reset to "1" in STEP1-7.

The target air-fuel ratio calculating controller 6 decides whether the engine 1 is operating with a lean air-fuel mixture or not in STEP1-3. The target air-fuel ratio calculating controller 6 decides whether the ignition timing of the engine 1 is retarded for early activation of the catalytic converter 3 immediately after the start of the engine 1 or not in STEP1-4. If the conditions of these steps are satisfied, then since the target air-fuel ratio KCMD calculated by the target air-fuel ratio calculating controller 6 is not used for the fuel control for the engine 1, the processing in STEP1-6, STEP1-7 is executed to set the values of the flags f/btc/cal, f/id/reset respectively to "0" and "1".

If the conditions of STEP1-1, STEP1-2 are satisfied and the conditions of STEP1-3, STEP1-4 are not satisfied, then the value of the flag f/btc/cal is set to "1" in STEP1-5.

By thus setting the flag f/btc/cal, even in a of situation where the target air-fuel ratio KCMD calculated by the target air-fuel ratio calculating controller 6 is not used by the fuel supply controller 7 (see FIG. 10), when the supply of fuel to the engine 1 is being cut off or when the throttle valve is being fully open, the flag f/btc/cal is set to "1". When the supply of fuel to the engine 1 is being cut off or when the throttle valve is being fully open, therefore, the target air-fuel ratio calculating controller 6 performs the process of calculating the target air-fuel ratio KCMD. This is because such an operating situation of the engine 1 is basically temporary.

In FIG. 11, after the above deciding subroutine, the target air-fuel ratio calculating controller 6 determines the value of the flag f/btc/cal set in STEP1 in STEP2. If f/btc/cal=0, then the target air-fuel ratio calculating controller 6 puts an end to the processing in the present control cycle immediately without calculating the target air-fuel ratio KCMD.

If f/btc/cal=1 in STEP2, then the target air-fuel ratio calculating controller 6 acquires data of the present value KACT(k) of the output KACT of the LAF sensor 4 and data of the present value VS(k) of the output VS of the exhaust gas sensor 5 in STEP3.

Then, the target air-fuel ratio calculating controller 6 determines a differential output kact(k) by subtracting the air-fuel ratio reference value FLAF/BASE from the output KACT(K) of the LAF sensor 4 which has been acquired in STEP3 in STEP4.

Then, the target air-fuel ratio calculating controller 6 performs the process of identifying the parameters a1, b1, c1 according to its function as the identifying means 8 in STEP5.

Figure 13:
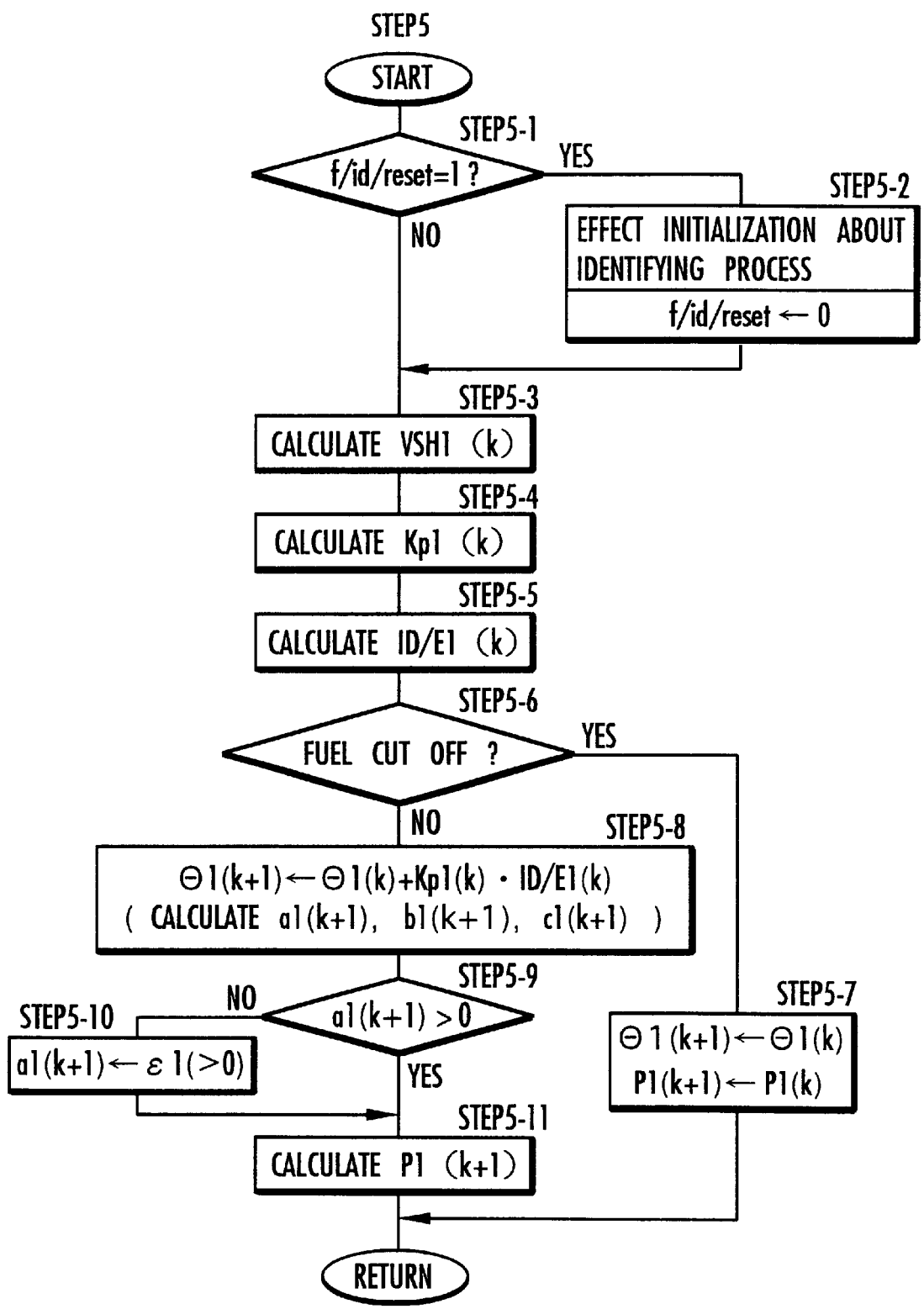
FIG. 13 is a flowchart of a subroutine of the processing sequence shown in FIG. 11.

The process of identifying the parameters a1, b1, c1 is carried out according to a subroutine shown in FIG. 13.

As shown in FIG. 13, the identifying means 8 determines the value of the flag f/id/reset in STEP5-1. If the value of the flag f/id/reset is "1", then the identifying means 8 performs an initialization with respect to the identifying process in STEP5-2. In this initialization, the identified values of the parameters a1, b1, c1 are set to predetermined initial values (the identified parameter vector Θ1 is initialized), and the elements of the matrix P1 (diagonal matrix) according to the equation (6) are set to predetermined initial values. The value of the flag f/id/reset is reset to "0".

Then, the identifying means 8 calculates the equation (2) to determine a function output VSH1(k) of the exhaust gas sensor 5, using the present values a1(k), b1(k), c1(k) (the identified values determined in the preceding control cycle) of the parameters a1, b1, c1 and the present value kact(k) of the differential output kact of the LAF sensor 4 determined in STEP4 in STEP5-3.

The identifying means 8 then calculates the vector Kpl(k) to be used in determining the new identified values of the parameters a1, b1, c1 in STEP5-4. Thereafter, the identifying means 8 calculates the identified error ID/E1(k) in STEP5-5.

The identified error ID/E1(k) is calculated according to the equation (3) from the present value VS(k) of the exhaust gas sensor 5 acquired in STEP3 and the function output VSH1(k) determined in STEP5-3. The vector Kp1(k) is calculated according to the equation (5) from the vector $\xi1(k)$ defined with respect to the equation (2) using the present differential output kact(k) of the LAF sensor 4 and the present value P1(k) of the matrix P1 (which is basically the matrix P finally determined in the preceding control cycle).

The identifying means 8 then decides whether the supply of fuel to the engine 1 is being stopped or not in STEP5-6. If the supply of fuel to the engine 1 is being stopped, then since the output KACT of the LAF sensor 4 and the output VS of the exhaust gas sensor 5 which are suitable to identify the values of the parameters a1, b1, c1 are not available, the identifying means 8 keeps the identified parameter vector Θ1 at the preset value, i.e., keeps the new identified values a1(k+1), b1(k+1), c1(k+1) of the parameters a1, b1, c1 at the present values a1(k), b1(k), c1(k), respectively, and keeps the matrix P1 at the present value in STEP5-7. Then, the processing in STEP5 is finished, and control returns to the routine shown in FIG. 11.

If the supply of fuel to the engine 1 is not being stopped in STEP5-6, then the identifying means 8 updates the identified parameter vector Θ1 according to the equation (4) using the vector Kp1(k) and the identified error ID/E1(k) determined in STEP5-4, STEP5-5, thus determining the new identified values a1(k+1), b1(k+1), c1(k+1) of the parameters a1, b1, c1 in STEP5-8.

Then, the identifying means 8 decides whether the new identified value a1(k+1) of the parameter a1 is positive or not in STEP5-9.

Because the air-fuel ratio-related characteristics of the output VS of the exhaust gas sensor 5 as expressed by the above quadratic function basically have a minimum value, the identified value a1(k+1), of the parameter a1 which is the coefficient of the term of second degree of the quadratic function must be a positive value. If the identified value a1(k+1) becomes negative due to disturbances or. the like, then the quadratic function with the negative identified value a1(k+1) as the coefficient of the term of second degree thereof does not have a minimum value, but a maximum value. Using this quadratic function, it would not be possible to appropriately determine the target air-fuel ratio KCMD for maximizing the purification rate of is the NOx by the catalytic converter 3.

Therefore, if a1(k+1)≦0 in STEP5-9, then the identifying means 8 forcibly sets the latest identified value a1(k+1) of the parameter a1 to a predetermined value $\epsilon1$ which is a sufficiently small positive value (e.g., 0.01) in STEP5-10. In this manner, the identified value of the parameter a1 is limited to a positive value such that the function output VSH1 which is a function value of the quadratic function and the NOx concentration corresponding to the function output VSH1 have a minimum value. If a1(k+1)>0 in STEP5-9,then the latest identified value a1(k+1) of the parameter a1 remains as it is.

After having limited the identified value of the parameter a1, the identifying means 8 updates the matrix P1 according to the equation (6) for the processing in the next control cycle in STEP5-11. Then, the processing in STEP5 is finished, and control returns to the routine shown in FIG. 11.

In FIG. 11, after having identified the values of the parameters a1, b1, c1 of the quadratic function, the target air-fuel ratio calculating controller 6 calculates a target differential air-fuel ratio kcmd(k) in the present control cycle according to the equation (9) from the latest identified values a1(k+1), b1(k+1), c1(k+1) of the parameters a1, b1, c1 in STEP6.

Specifically, if the criterion formula $(b1^2 - 4 \cdot a1 \cdot c1)$ determined by the latest identified values a1(k+1), b1(k+1), c1(k+1) is equal to or smaller than "0", which is a normal case, then the target air-fuel ratio calculating controller 6 calculates a target differential air-fuel ratio kcmd(k) according to the upper expression of the equation (9). If the criterion formula $(b1^2 - 4 \cdot a1 \cdot c1)$ is of a positive value greater than "0", which corresponds to the brand-new state of the catalytic converter 3, then the target air-fuel ratio calculating controller 6 calculates a target differential air-fuel ratio kcmd(k) according to the lower expression of the equation (9).

Then, the target air-fuel ratio calculating controller 6 adds the air-fuel ratio reference value FLAF/BASE to the target differential air-fuel ratio kcmd(k), thus determining a target air-fuel ratio KCMD(k) in the present control cycle in STEP7.

The target air-fuel ratio KCMD(k) thus determined in a memory (not shown) in a time-series fashion. When the fuel supply controller 7 is to manipulate the air-fuel ratio of the engine 1 using the target air-fuel ratio KCMD(k), the latest one of the time-series data of the target air-fuel ratio KCMD(k) is selected in each control cycle of the fuel supply controller 7.

If the identified value a1(k+1) of the parameter a1 of the quadratic function is set to the positive value $\epsilon1$ in STEP5-10, then the target differential air-fuel ratio kcmd calculated using the value of the parameter a1 and the identified value b1(k+1) of the parameter b1 in STEP6 may possibly produce an error with respect to a target differential air-fuel ratio which is to be achieved, i.e., a target differential air-fuel ratio which minimizes the NOx concentration downstream of the catalytic converter 3. According to the sequential identifying algorithm of the identifying means 8, in a control cycle after the identified value of the parameter a1 is limited to the positive value $\epsilon1$, it is basically possible to quickly obtain a set of identified values of the parameters a1, b1, c1 with the identified value of the parameter a1 being positive. The situation where the identified value of the parameter a1 is negative tends to occur when the catalytic converter 3 is brand-new. When the catalytic converter 3 is brand-new, since the purification rate of the NOx by the catalytic converter 3 is high in a wide range of air-fuel ratios of the engine 1, any error of the target differential air-fuel ratio kcmd which is produced when the identified value of the parameter a1 is forcibly limited does not pose practical problems.

The operation of the control apparatus according to the present embodiment has been described in detail above.

In this embodiment, the parameters a1, b1, c1 of the quadratic function that approximates the air-fuel ratio-related characteristics of the output VS of the exhaust gas sensor 5 (NOx sensor), which are also the air-fuel ratio-related characteristics of the NOx concentration detected by the exhaust gas sensor 5, are sequentially identified in each control cycle of the target air-fuel ratio calculating controller 6 according to the sequential identifying algorithm, i.e., the algorithm of a sequential method of least squares in this embodiment, using the actual output VS of the exhaust gas sensor 5 and the actual output KACT of the LAF sensor 4 (the detected value of the actual air-fuel ratio of the engine 1).

Therefore, the values of the parameters a1, b1, c1 of the quadratic function are identified in a real-time fashion depending on the operating state of the engine 1 and the behavioral state of the catalytic converter 3 from instant to instant. As a result, the quadratic function determined by the identified values of the parameters a1, b1, c1 is capable of well approximating the above air-fuel ratio-related characteristics.

In view of the fact that the air-fuel ratio-related characteristics of the actual output VS of the exhaust gas. sensor 5 (NOx sensor) basically have a minimum value, the identified value of the parameter a1 which is the coefficient of the term of second degree of the quadratic function is limited to a positive value such that the quadratic function has a minimum value. In this manner, the reliability of the quadratic function that is determined by the identified values of the parameters a1, b1, c1 as approximating the air-fuel ratio-related characteristics is increased.

In the present embodiment, the output KACT of the LAF sensor 4 is not directly used, but the differential output kact which represents the difference between the output KACT and the air-fuel ratio reference value FLAF/BASE is used, in order to identify the values of the parameters a1, b1, c1. Therefore, the accuracy of the identified values of the parameters a1, b1, c1 is increased.

Furthermore, the processing of the target air-fuel ratio calculating controller 6 basically sets the value of the air-fuel ratio which minimizes the function output VSH1 of the exhaust gas sensor 5 that is the function value of the quadratic function, i.e., the value of the air-fuel ratio which minimizes the NOx concentration recognized from the function output VS, as the target air-fuel ratio KCMD.

Therefore, the target air-fuel ratio KCMD is substantially in agreement with the value of the air-fuel ratio of the engine 1 which minimizes the actual output VS of the exhaust gas sensor 5 or the actual NOx concentration represented thereby, i.e., the NOx concentration in the exhaust gas purified by the catalytic converter 3.

In this embodiment, the fuel injection quantity (fuel supply quantity) for the engine 1 is adjusted according to the feedback control process in order to converge the output KACT of the LAF sensor 4, i.e., then detected value of the actual air-fuel ratio of the engine 1, to the target air-fuel ratio KCMD. The feedback control process is carried out mainly by the adaptive controller 17. Thus, the air-fuel ratio of the engine 1 can be controlled at the target air-fuel ratio KCMD accurately with a high quick response.

As a result, NOx can optimally be purified by the catalytic converter 3, i.e., NOx can optimally be purified to maximize the purification rate thereof.

At an air-fuel ratio state which maximizes the purification rate of NOx, gas components such as HC other than NOx are also well purified by the catalytic converter 3. Therefore, when the air-fuel ratio of the engine 1 is controlled at the target air-fuel ratio KCMD maximizes the purification rate of NOx, the catalytic converter 3 can well purify NOx and also gas components other than NOx.

The present embodiment takes into account the fact that the air-fuel ratio-related characteristics of the output VS of the exhaust gas sensor 5 have no maximum value when the catalytic converter 3 is brand-new. In the situation where the function output VSH1 of the exhaust gas sensor 5 which is the function value of the quadratic function determined by the identified values of the parameters a1, b1, c1 is of a negative value, i.e., in the situation where the criterion formula $(b1^2 - 4 \cdot a1 \cdot c1)$ is of a positive value, the value of the air-fuel ratio in the leaner air-fuel ratio range at which the function value of the quadratic function (the function output VSH1) is "0" is set as the target air-fuel ratio KCMD.

Consequently, even when the catalytic converter 3 is brand-new, the catalytic converter 3 can well purify various gas components including NOx without impairing the purification of the other gas components than NOx. Thus, the catalytic converter 3 can maintain its good purifying capability irrespective of the deteriorated state thereof.

In the present embodiment, the output VS of the exhaust gas sensor 5 has positive characteristics with respect to the NOx concentration. However, an exhaust gas sensor 5 whose output VS has negative characteristics (the output VS decreases as NOx increases) with respect to the NOx concentration as indicated by the imaginary-line curve in FIG. 2 may be employed. With such negative characteristics, because the NOx concentration detected by the exhaust gas sensor, i.e., the NOx concentration recognized from the output of the exhaust gas sensor 5, has a minimum value with respect to the air-fuel ratio of the engine 1 as described above, the output itself of the exhaust gas sensor has a maximum value with respect to the air-fuel ratio of the engine 1. In this case, as with the present embodiment, it is possible to determine a target air-fuel ratio of the engine 1 for maximizing the purification rate of NOx, e.g., a target air-fuel ratio of the engine 1 for minimizing the NOx concentration detected by the exhaust gas sensor.

Specifically, the air-fuel ratio-related characteristics of the output of the exhaust gas sensor are expressed by a quadratic function, and the values of the parameters of the quadratic function are identified, as with the above embodiment. Basically, the value of the air-fuel ratio which maximizes the function value of the quadratic function is determined as a target air-fuel ratio, so that it is possible to determine a target air-fuel ratio for minimizing the NOx concentration detected by the exhaust gas sensor 5. When the catalytic converter 3 is brand-new, if the maximum value of the function value of the quadratic function is in excess of the output of the exhaust gas sensor at the time the NOx concentration is "0", i.e., the maximum output which the exhaust gas sensor can produce as the NOx concentration varies, one in the leaner air-fuel ratio range of the two values of the air-fuel ratio at which the function value of the quadratic function is equal to the maximum output of the exhaust gas sensor may be used as a target air-fuel ratio.

In the above embodiment, the output VS of the exhaust gas sensor 5 is used as a dependent variable of the quadratic function. However, the NOx concentration recognized from the output VS of the exhaust gas sensor 5, i.e., the NOx concentration converted from the output VS according to the characteristics shown in FIG. 2, may be used as a dependent variable of the quadratic function. In this case, the values of the parameters of the quadratic function are identified using data of the NOx concentration converted from the data of the actual output VS of the exhaust gas sensor 5. Then, basically, the value of the air-fuel ratio which minimizes the function value of the quadratic function may be determined as a target air-fuel ratio. The algorithm for determining the target air-fuel ratio remains the same irrespectively of whether the output of the exhaust gas sensor 5 is of positive or negative characteristics.

A control apparatus according to a second embodiment of the present invention will be described below with reference to FIGS. 14 through 17. The control apparatus according to the second embodiment differs from the control apparatus according to the first embodiment with respect to the type of an exhaust gas sensor, i.e., the type of a gas component that is detected, and part (specifically, the processing in STEP6 shown in FIG. 11) of the processing sequence of the target air-fuel ratio calculating controller, and is identical to the control apparatus according to the first embodiment with respect to other system details and operation. Therefore, those parts of the control apparatus according to the second embodiment which are identical to those of the control apparatus according to the first embodiment are denoted by identical reference characters, and will not be described in detail below.

In the second embodiment, the exhaust gas sensor 5 disposed downstream of the catalytic converter 3 shown in FIG. 1 comprises an HC sensor for detecting the concentration of HC among gas components to be purified by the catalytic converter 3. The characteristics of the output VS the exhaust gas sensor 5 with respect to the HC concentration are positive characteristics such that the level of the output VS increases substantially linearly as the HC concentration increases.

The characteristics of purification of HC by the catalytic converter 3 will be described below.

Figure 15:
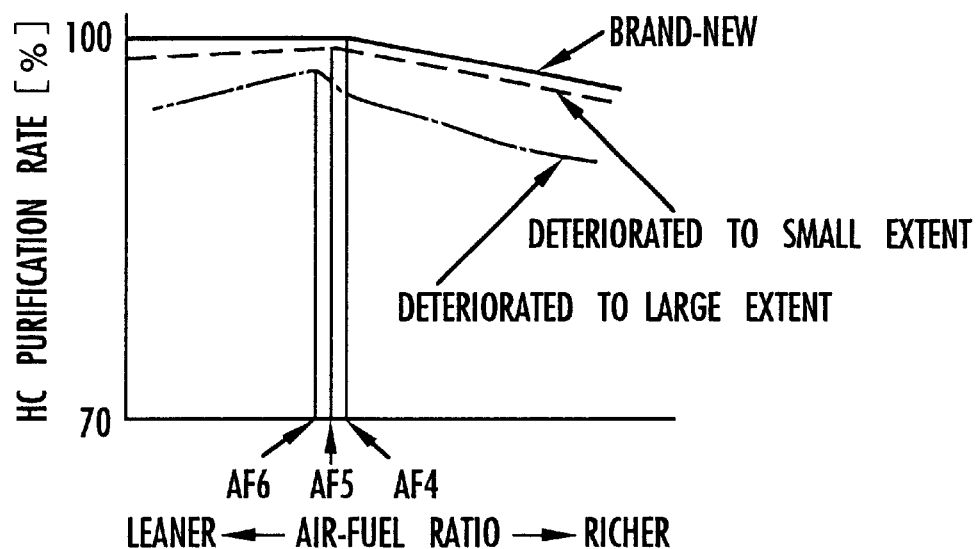
FIG. 15 is a diagram showing the capabilities of the catalytic converter (the catalytic converter shown in FIG. 1) of the control apparatus according to the second embodiment to purify HC.

The catalytic converter 3 basically has the characteristics of purification of HC, i.e., the charactertistics of the purification rate of HC, with respect to changes in the air-fuel ratio of the engine 1, as shown in FIG. 15. Specifically, a solid-line curve, a broken-line curve, and a dot-and-dash-line curve shown in FIG. 15 represent catalytic converters 3 which correspond respectively to the solid-line, broken-line, and dot-and-dash-line curves shown in FIG. 3.

As indicated by the solid-line curve shown in FIG. 15, the purification rate of HC by the brand-new catalytic converter 3 is of a substantially constant maximum level (substantially 100%) when the air-fuel ratio of the engine 1 is in an air-fuel ratio range leaner than a certain value AF4 (this value is essentially in agreement with the value AF1 of the air-fuel ratio shown in FIG. 3), and decreases when the air-fuel ratio of the engine 1 is in an air-fuel ratio range richer than the value AF4.

Figure 17:
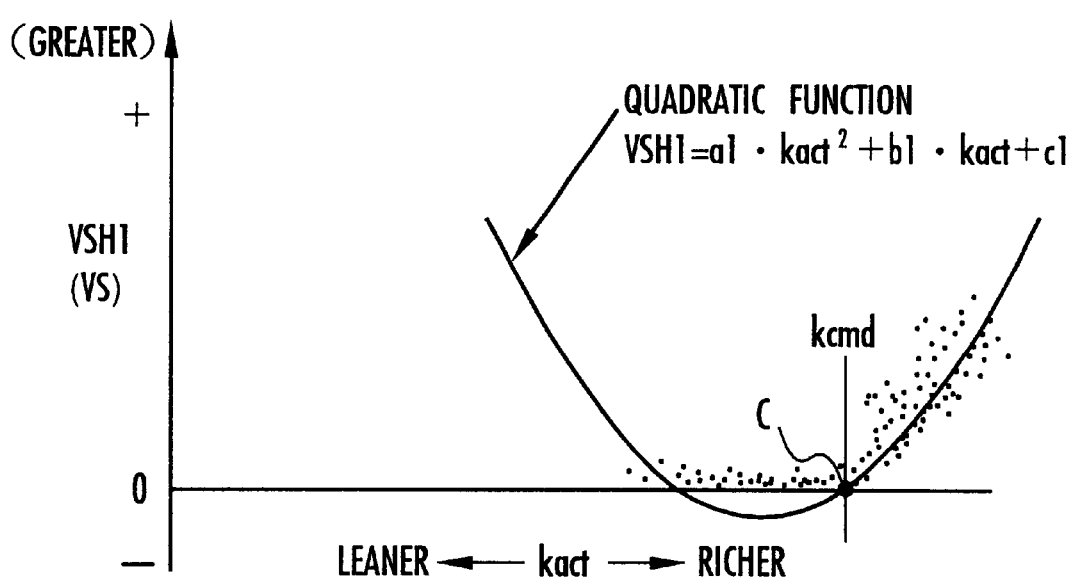
FIG. 17 is a diagram illustrative of a process of calculating a target air-fuel ratio according to the second embodiment.

When the catalytic converter 3 is deteriorated to a certain extent, as indicated by the broken-line and dot-and-dash-line curves in FIG. 17, the purification rate of HC has a maximum value, i.e., a peak, at a certain air-fuel ratio AF5 (the broken-line curve) or a certain air-fuel ratio AF6 (the dot-and-dash-line curve). Furthermore, the purification rate of HC decreases when the air-fuel ratio of the engine 1 changes to a richer range or a leaner range from the air-fuel ratio AF5 or AF6 which corresponds to the maximum purification rate of HC. The values AF5, AF6 generally agree with the respective values AF2, AF3 shown in FIG. 3.

The reduction from the maximum value of the purification rate of HC is slightly more gradual in the leaner air-fuel ratio range than in the richer air-fuel ratio range, i.e., the gradient of the curve is smaller in the leaner air-fuel ratio range than in the richer air-fuel ratio range. The maximum value of the purification rate of HC when the catalytic converter 3 is deteriorated is smaller than the maximum value of the purification rate of HC when the catalytic converter 3 is brand-new. The maximum value of the purification rate of HC becomes smaller as the catalytic converter 3 is progressively deteriorated.

Therefore, as with the purification rate of NOx, the purification rate of HC purified by the catalytic converter 3 has such characteristics that it basically has a maximum value as the air-fuel ratio of the engine 1 changes, except when the catalytic converter 3 is brand-new.

In the various deteriorated states of the catalytic converter 3, including the brand-new state of the catalytic converter 3, the air-fuel ratios AF4, AF5, AF6 where the purification rate of HC is maximum are basically shifted into the leaner air-fuel ratio range as the deterioration of the catalytic converter 3 progresses. Furthermore, the purification rate of HC changes sharply, i.e., the curves of the purification rate of HC become convex more sharply, in the vicinity of the air-fuel ratios AF4, AF5, AF6 basically as the deterioration of the catalytic converter 3 progresses.

Figure 16:
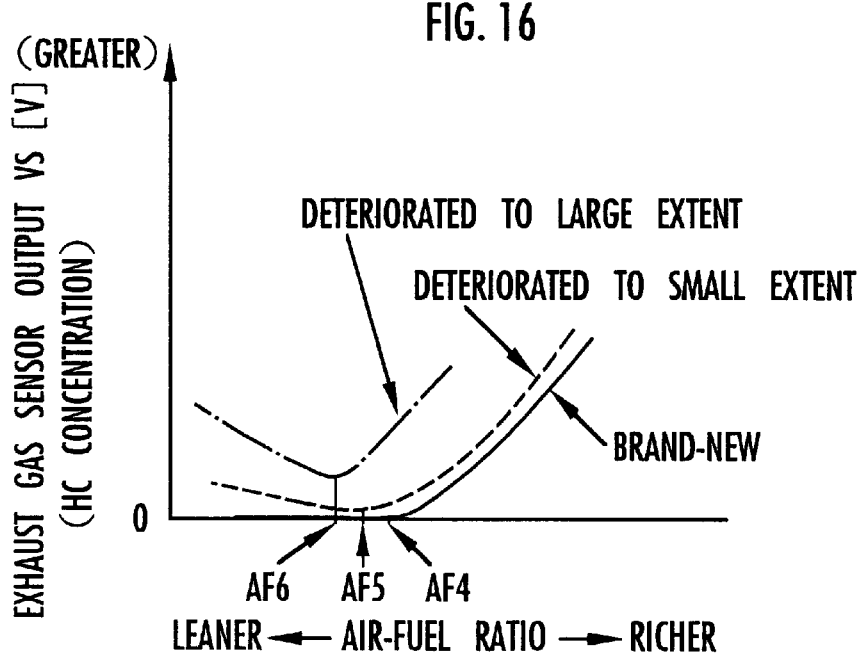
FIG. 16 is a diagram showing the output of the exhaust gas sensor (HC sensor) used by the control apparatus according to the second embodiment or the concentration of HC detected by the exhaust gas sensor depending on the air-fuel ratio.

Since the catalytic converter 3 has the above HC purification characteristics, the HC concentration detected by the exhaust gas sensor 5 (HC sensor) downstream of the catalytic converter 3, i.e., the HC concentration of the exhaust gas that has been purified by the catalytic converter 3, is basically of such characteristics representing a vertical reversal of the characteristic curves shown in FIG. 15, with respect to changes in the air-fuel ratio of the engine 1, as shown in FIG. 16. Accordingly, as with the NOx concentration of the exhaust gas that has been purified by the catalytic converter 3, the HC concentration basically has minimum values as indicated by the broken-line and dot-and-dash-line concave curves in FIG. 16, except when the catalytic converter 3 is brand-new as represented by the solid-line curve shown in FIG. 16.

Because the output characteristics of the exhaust gas sensor 5 with respect to the HC concentration are positive characteristics as described above, the characteristics of the output VS of the exhaust gas sensor 5 with respect to changes in the air-fuel ratio of the engine 1 are also the same as the characteristics of the HC concentration shown in FIG. 16. Specifically, the characteristics of the output VS of the exhaust gas sensor 5 (HC sensor) with respect to changes in the air-fuel ratio of the engine 1, except when the catalytic converter 3 is brand-new, or when the catalytic converter 3 is somewhat deteriorated, are such that the output VS of the exhaust gas sensor 5 has minimum values as indicated by the concave curves in FIG. 16 at the air-fuel ratios AF5, AF6 of the engine 1 where the purification rate of HC by the catalytic converter 3 is maximum, as indicated by the broken-line and dot-and-dash-line curves in FIG. 16. When the catalytic converter 3 is brand-new, as indicated by the solid-line curve in FIG. 16, in an air-fuel ratio range leaner than the air-fuel ratio AF4, i.e., in an air-fuel ratio range where the purification rate of HC is kept at a substantially constant maximum level (about 100%), the output VS of the exhaust gas sensor 5 is kept at a substantially constant minimum level (about 0 V). When the air-fuel ratio of the engine 1 changes to a value richer than the value AF4, the output VS of the exhaust gas sensor 5 increases.

Based on the purification characteristics of the catalytic converter 3, the target air-fuel ratio calculating controller 6 will be described below.

Figure 18:
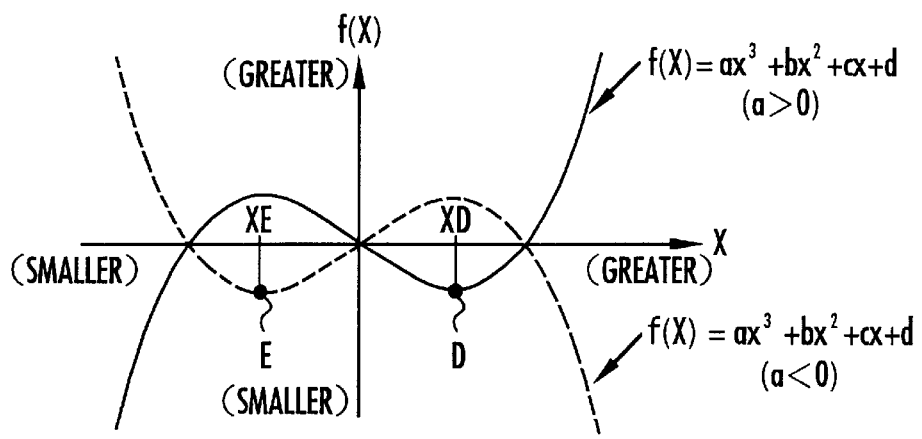
FIG. 18 is a diagram showing the graph of a cubic function used in a third embodiment of the present invention.

As described above, the characteristics of the output VS of the exhaust gas sensor 5 (HC sensor) with respect to the air-fuel ratio of the engine 1, i.e., the air-fuel ratio-related characteristics of the output VS, basically have minimum values as indicated by the concave curves in FIG. 18, as is the case with the air-fuel ratio-related characteristics of the output of the NOx sensor described above with respect to the first embodiment.

Therefore, the air-fuel ratio-related characteristics of the output VS of the exhaust gas sensor 5 (HC sensor), i.e., the air-fuel ratio-related characteristics of the. HC concentration recognized from the output VS of the exhaust gas sensor 5, can approximately be expressed by a quadratic function according to the equation (1) by identifying the parameters a1, b1, c1 of the quadratic function in the same manner as with the first embodiment. The target air-fuel ratio KCMD which maximizes the purification rate of HC by the catalytic converter 3 is basically given as the value of an air-fuel ratio where the function value of the above quadratic function, i.e., the function output VSH1 of the exhaust gas sensor 5, is minimum.

In the present embodiment, the target air-fuel ratio calculating controller 6 for determining the target air-fuel ratio KCMD of the engine 1 uses the quadratic function according to the equation (1) as a nonlinear function representing the air-fuel ratio-related characteristics of the output VS of the exhaust gas sensor 5 (HC sensor). The target air-fuel ratio calculating controller 6 then identifies the values of the parameters a1, b1, c1 of the quadratic function according to the algorithm (sequential identifying algorithm) described above in the first embodiment (see the equations (2)–(6) and FIG. 13).

The target air-fuel ratio calculating controller 6 basically determines, as the target air-fuel ratio KCMD, the value of an air-fuel ratio which minimizes the function value of the quadratic function with the values of the parameters a1, b1, c1 thereof being identified. The target differential air-fuel ratio kcmd (=KCMD−FLAF/BASE) which determines the target air-fuel ratio KCMD can be determined using the identified values of the parameters a1, b1 according to the equation (7), and the target air-fuel ratio KCMD can be obtained by adding the air-fuel ratio reference value FLAF/BASE to the target differential air-fuel ratio kcmd.

In the present embodiment, however, when the catalytic converter 3 is brand-new, the target air-fuel ratio KCMD is determined according to processing operations different from those of the first embodiment.

Specifically, when the catalytic converter 3 is brand-new, the air-fuel ratio-related characteristics of the output VS of the exhaust gas sensor 5 (HC sensor) are indicated by the solid-line curve shown in FIG. 16, and hence have no minimum values, with the output VS being at a substantially constant minimum level (about 0 V) in the leaner air-fuel ratio range. In this case, sampled data of the output VS of the exhaust gas sensor 5 and the differential air-fuel ratio kact (=KACT−FLAF/BASE) according to the LAF sensor 4 are obtained with a tendency indicated by dots in FIG. 17, for example. At this time, the graph of the quadratic function determined by the identified values of the parameters a1, b1, c1 is indicated by the solid-line curve in FIG. 17. At this time, the minimum value of the function value of the quadratic function (the function output VSH1) is a negative value which the actual output VS of the exhaust gas sensor 5 cannot take, i.e., a value smaller than the output VS of the exhaust gas sensor 5 when the HC concentration is substantially "0".

When the catalytic converter 3 is brand-new, the air-fuel ratio at which the purification rates of various gas components such as NOx, including HC, are high is not of a value which minimizes the function value of the quadratic function, but generally of a value near the air-fuel ratio at a point C in FIG. 17.

In the present embodiment, if the minimum value of the quadratic function determined by the identified values (latest identified values) of the parameters a1, b1, c1 becomes negative, i.e., if the identified values of the parameters a1, b1, c1 satisfy the inequality: $b1^2-4 \cdot a1 \cdot c1 > 0$, then the target air-fuel ratio calculating controller 6 determines one of two values of the differential air-fuel ratio kact at which the function value of the quadratic function (the function output VSH1 of the exhaust gas sensor 5) is "0", which one of the two values is in the leaner air-fuel ratio range (the value of the differential air-fuel ratio kact at the point C in FIG. 17), as the target differential air-fuel ratio kcmd. Then, the target air-fuel ratio calculating controller 6 determines the target air-fuel ratio KCMD by adding the air-fuel ratio reference value FLAF/BASE to the target differential air-fuel ratio kcmd thus determined.

In the present embodiment, specifically, the target air-fuel ratio calculating controller 6 determines the target differential air-fuel ratio kcmd(k) depending on the value of the criterion formula $(b1^2 - 4 \cdot a1 \cdot c1)$ determined by the identified values (specifically, the latest identified values a1(k+1), b1(k+1), c1(k+1)) of the parameters a1, b1, c1 of the quadratic function, according to the following equations (22):

When $b1^2 - 4 \cdot a1 \cdot c1 \leq 0$, $$kcmd = -\frac{b1}{2 \cdot a1}$$

When $b1^2 - 4 \cdot a1 \cdot c1 > 0$, $$kcmd = \frac{-b1 + \sqrt{b1^2 - 4 \cdot a1 \cdot c1}}{2 \cdot a1} \qquad (22)$$

Then, the target air-fuel ratio calculating controller 6 determines the target air-fuel ratio KCMD(k) in each control cycle by adding the air-fuel-ratio reference value FLAF/BASE to the target differential air-fuel ratio kcmd(k) thus determined, according to the above equation (10).

The equation (22) is the same as the equation (9) according to the first embodiment when $b1^2 - 4 \cdot a1 \cdot c1 \leq 0$, but differs from the equation (9) when $b1^2 - 4 \cdot a1 \cdot c1 > 0$, i.e., when the catalytic converter 3 is brand-new.

The processing of the target air-fuel ratio calculating controller 6 in the second embodiment differs from the processing of the target air-fuel ratio calculating controller 6 in the first embodiment with respect to the calculation of the target differential air-fuel ratio kcmd, i.e., the processing in STEP6 shown in FIG. 11. Other details of the processing of the target air-fuel ratio calculating controller 6 in the second embodiment are identical to details of the processing of the target air-fuel ratio calculating controller 6 in the first embodiment.

Other structural and operational details, e.g., structural and operational details of the fuel supply controller 7, are exactly the same as those of the first embodiment.

The control apparatus according to the second embodiment offers the same advantages as those of the control apparatus according to the first embodiment. Those advantages will be summarized below. The parameters a1, b1, c1 are identified to obtain a quadratic function which well approximates the air-fuel ratio-related characteristics of the output VS of the exhaust gas sensor 5 (HC sensor). Using the above quadratic function, it is possible to determine the target air-fuel ratio KCMD of the engine which minimizes the output VS of the exhaust gas sensor 5 (HC sensor), i.e., the HC concentration of the exhaust gas that has been purified by the catalytic converter 3. When the air-fuel ratio of the engine 1 is manipulated into the target air-fuel ratio KCMD according to the feedback control process using the adaptive controller 17, the catalytic converter 3 can well purify HC, i.e., purify HC in a manner to maximize the purification rate of HC.

When the catalytic converter 3 is brand-new, i.e., when the function output VSH1 of the exhaust gas sensor 5 which is the function value of the quadratic function determined by the identified values of the parameters a1, b1, c1 is of a negative value, one, in the richer air-fuel ratio range, of the values of the air-fuel ratio at which the function value of the quadratic function (the function output VSH1) is "0" is established as the target air-fuel ratio KCMD. Therefore, the catalytic converter 3 can well purify various gas components including HC regardless of the deteriorated state of the catalytic converter 3.

The second embodiment may also be modified in the same manner as described above with respect to the first embodiment. Specifically, the exhaust gas sensor 5 may have negative characteristics such that the output VS decreases as the HC concentration increases, as indicated by the imaginary-line curve in FIG. 14. Furthermore, the independent variable of the quadratic function may represent the HC concentration recognized from the output VS according to the characteristics shown in FIG. 14, rather than the output VS of the exhaust gas sensor 5.

A control apparatus according to a third embodiment of the present invention will be described below with reference to FIGS. 18 through 20. The control apparatus according to the third embodiment differs from the control apparatus according to the first embodiment with respect to part (specifically, the processing in STEP5, STEP6 shown in FIG. 11) of the processing sequence of the target air-fuel ratio calculating controller, and is identical to the control apparatus according to the first embodiment with respect to other system details and operation. Therefore, those parts of the control apparatus according to the third embodiment which are identical to those of the control apparatus according to the first embodiment are denoted by identical reference characters, and will not be described in detail below.

As shown in FIG. 4 described above with respect to the first embodiment, according to the air-fuel ratio-related characteristics of the actual output VS of the exhaust gas sensor 5, i.e., the NOx sensor of the positive characteristics, the graph has different gradients in the air-fuel ratio ranges on both sides of the air-fuel ratio value, i.e., AF2 or AF3 shown in FIG. 4, where the output VS is minimum, i.e., the air-fuel ratio range leaner than the air-fuel ratio value and the air-fuel ratio range richer than the air-fuel ratio value. Specifically, the graph gradient is basically smaller in the air-fuel ratio range richer than the air-fuel ratio value at which the actual output VS of the exhaust gas sensor 5 is minimum, than in the air-fuel ratio range leaner than the air-fuel ratio value.

Therefore, in order to express the air-fuel ratio-related characteristics of the actual output VS of the exhaust gas sensor 5, or more specifically the characteristics in the air-fuel ratio range near the air-fuel ratio value at which the output VS is minimum, in a manner to better match the actual characteristics, it is considered preferable to use a nonlinear function, e.g., a cubic function, to represent the air-fuel ratio-related characteristics.

Specifically, when a cubic function is generally represented by the equation $f(X)=aX^3+bX^2+cX+d$ (X: independent variable), the graph thereof is basically of a solid-line shape (a>0) or a broken-line shape (a<0) (which has a maximum value and a minimum value) depending on whether the value of the coefficient "a" of the cubic term is positive or negative. Near minimum points D, E of the graph of the cubic function $f(X)$, if a>0, then the gradient of the graph at values of X greater than a value XD at the minimum point D is greater than the gradient of the graph at values of X smaller than the value XD, and if a<0, then the gradient of the graph at values of X greater than a value XE at the minimum point E is smaller than the gradient of the graph at values of X smaller than the value XE.

In view of the above features of the cubic function, it is preferable to express the gradient of the graph near the minimum value of the air-fuel ratio-related characteristics of the actual output VS of the NOx sensor as the exhaust gas sensor 5, with a cubic function including a cubic term whose coefficient (parameter) is of a negative value.

In this embodiment, therefore, a cubic function is used as a nonlinear function that approximately represents the air-fuel ratio-related characteristics of the out-put VS of the exhaust gas sensor 5. The cubic function is defined according to the following equation (23) with an independent variable represented by the differential output kact of the LAF sensor 4 and a dependent variable represented by the output of the exhaust gas sensor 5, as with the first embodiment:

$$VSH2 = a2 \cdot kact^3 + b2 \cdot kact^2 + c2 \cdot kact + d2 \tag{23}$$

where kact=KACT−FLAF/BASE.

In the equation (23), the output of the exhaust gas sensor 5 (hereinafter referred to as "function output") which is the function value of the cubic function (the value of the dependent variable) is denoted by "VSH2" (variable sign).

In the present embodiment, the coefficient a2 of the term "$kact^3$" of third degree, the coefficient b2 of the term "$kact^2$" of second degree, the coefficient c2 of the term "kact" of first degree, and the constant term d2 are parameters whose values are to be identified by the function as the identifying means 8 of the target air-fuel ratio calculating controller 6. The identifying means 8 of the target air-fuel ratio calculating controller 6 identifies the values of the above parameters a2, b2, c2, d2 according to a sequential identifying algorithm that is constructed as follows:

Inasmuch as the basic process of the sequential identifying algorithm is the same as the basic process of the sequential identifying algorithm according to the first embodiment, the sequential identifying algorithm will briefly be described below.

According to the sequential identifying algorithm, in each control cycle of the target air-fuel ratio calculating controller 6, a function output VSH2(k) (the function value of the cubic function) of the exhaust gas sensor 5 in each control cycle is determined according to the equation (24) given below, using the present value kact(k) of a differential output of the LAF sensor 4 and present identified values a2(k), b2(k), c2(k), d2(k) of the parameters a2, b2, c2, d2.

$$VSH2(k) = a2(k) \cdot kact(k)^3 + b2(k) \cdot kact(k)^2 + c2(k) \cdot kact(k) + d2(k) = \Theta2^T(k) \cdot \xi2(k) \tag{25}$$

where $\Theta2^T(k)=[a2(k) b2(k) c2(k) d2(k)]$ $\xi2^T(k)=[kact(k)^3 kact(k)^2 kact(k) 1]$ An identified error ID/E2(k) given as the difference between the function output VSH2(k) and an actual output VS(k) of the exhaust gas sensor 5 in the present control cycle is determined according to the following equation (25):

$$ID/E2(k) = VS(k) - VSH2(k) \tag{25}$$

Using the identified error ID/E2(k), the identified parameter vector 92 defined according to the equation (24) is updated according to the following equation (26) to determine a new identified parameter vector Θ2(k+1), i.e., new identified values a2(k+1), b2(k+1), c2(k+1), d2(k+1) of parameters a2, b2, c2, d2 of the identified parameter vector Θ2:

$$\Theta 2(k+2) = \Theta 2(k) + Kp2(k) \cdot ID/E2(k) \tag{26}$$

where "Kp2(k)" represents a quartic vector determined according to the equation (27) given below in each control cycle.

$$Kp2(k) = \frac{P2(k) \cdot \xi 2(k)}{1 + \xi 2^T(k) \cdot P2(k) \cdot \xi 2(k)} \tag{27}$$

where ξ2(k) represents a vector defined according to the equation (24), and P2(k) represents a quartic square matrix updated in each control cycle by a recursive formula expressed by the following equation (28):

$$P2(k+1) = \frac{1}{\lambda 3} \cdot \left( I - \frac{\lambda 4 \cdot P2(k) \cdot \xi 2(k) \cdot \xi 2^T(k)}{\lambda 3 + \lambda 4 \cdot \xi 2^T(k) \cdot P2(k) \cdot \xi 2(k)} \right) \cdot P2(k) \tag{28}$$

where I represents a unit matrix.

As with the first embodiment, depending on how λ3, λ4 in the equation (28) are established, any one of various specific identifying algorithms may be employed (0<λ3≦1, 0≦λ4≦1). According to the present embodiment, an identifying algorithm according to a sequential method of least squares (λ3=λ4=1), for example, is employed.

The algorithm described above is the sequential identifying algorithm to identify the values of the parameters a2, b2, c2, d2 of the cubic function.

In the present embodiment, for well approximating the air-fuel ratio-related characteristics of the out-put VS of the exhaust gas sensor 5 as the NOx sensor, particularly the gradient of the graph near the minimum value of the output VS, it is preferable that the value of the parameter a2 which is the coefficient of the term of third degree of the cubic function be negative. If the identified value a2(k+1) of the parameter a2 becomes a2(k+1)≧0 due to a disturbance, then the identified value a2(k+1) may be limited to a negative value.

Then, the target air-fuel ratio calculating controller 6 determines in each control cycle a target air-fuel ratio KCMD of the engine 1, which is also a target value of the air-fuel ratio detected by the LAF sensor 4, using the cubic function with the values of the parameters a2, b2, c2, d2 thereof being identified as described above.

The cubic function with the values of the parameters a2, b2, c2, d2 being identified is capable of well approximating the air-fuel ratio-related characteristics of the output VS of the exhaust gas sensor 5 (NOx sensor), or particularly the air-fuel ratio-related characteristics in the vicinity of an air-fuel ratio where the output VS is minimum.

Figure 19:
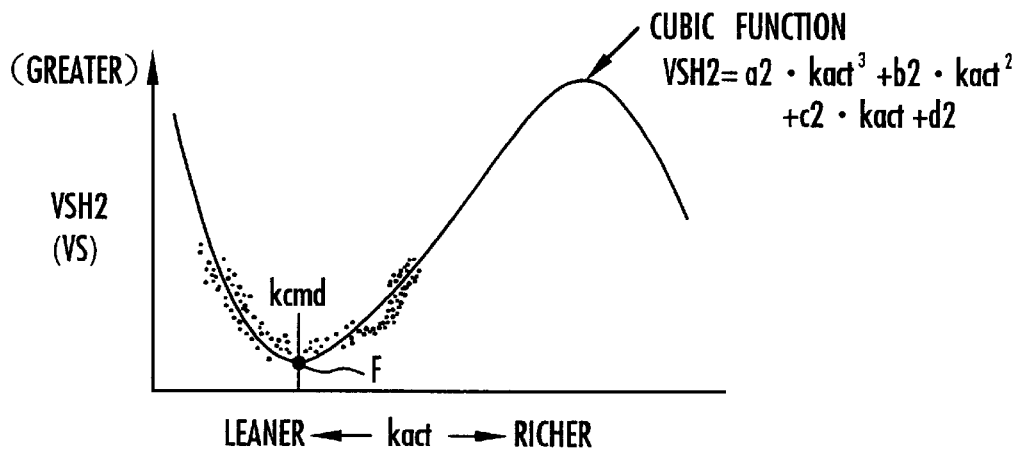
FIG. 19 is a diagram illustrative of a process of calculating a target air-fuel ratio according to the third embodiment.

For example, sampled data of the output VS of the exhaust gas sensor 5 and the differential air-fuel ratio kact (=KACT−FLAF/BASE) according to the LAF sensor 4 are obtained with a tendency indicated by dots in FIG. 19 when the catalytic converter 3 is in a certain deteriorated state. At this time, the graph of the cubic function determined by the identified values of the parameters a2, b2, c2, d2 is of a shape as indicated by the solid-line curve in FIG. 19.

In the present embodiment, as with the first embodiment, the air-fuel ratio of the engine 1 which minimizes the output VS of the exhaust gas sensor 5, i.e., the air-fuel ratio which maximizes the purification rate of NOx by the catalytic converter 3, is determined as the target air-fuel ratio KCMD.

The target air-fuel ratio calculating controller 6 determines in each control cycle the value of the differential air-fuel ratio kact which minimizes the function value (the function output VSH2) of the above cubic function, i.e., the value of the differential air-fuel ratio kact at a point F in FIG. 19, as a target differential air-fuel ratio kcmd (=KCMD−FLAF/BASE), and determines a target air-fuel ratio KCMD by adding the air-fuel ratio reference value FLAF/BASE to the target differential air-fuel ratio kcmd.

In view of the fact that the identified value of the parameter a1 is negative, the target differential air-fuel ratio kcmd, i.e., the value of the target differential air-fuel ratio kcmd which minimizes the function value (the function output VSH2) of the cubic function, is one of two values (because the cubic function basically has minimum and maximum values) of the differential air-fuel ratio kact at which the first derivative of the cubic function is "0", which one of the two values is in the leaner air-fuel ratio range. Therefore, the target differential air-fuel ratio kcmd can be determined using the identified values of the parameters a2, b2, c2, or more specifically the latest identified values a2(k+1), b2(k+1), c2(k+1) thereof, according to the following equation (29):

$$kcmd = \frac{-b2 - \sqrt{b2^2 - 3 \cdot a2 \cdot c2}}{3 \cdot a2} \tag{29}$$

(a2=a2(k+1), b2=b2(k+1), c2=c2(k+1), a2<0)

On the basis of the above description of the control apparatus according to the third embodiment, operation of the control apparatus according to the third embodiment will be described below. The control apparatus according to the third embodiment differs from the control apparatus according to the first embodiment with respect to the processing in STEP5, STEP6 shown in FIG. 11 (the identifying process and the process of calculating the target differential air-fuel ratio kcmd) carried out by the target air-fuel ratio calculating controller 6, and is identical to the control apparatus according to the first embodiment with respect to other processing details of the target air-fuel ratio calculating controller 6 and the fuel supply controller 7.

Figure 20:
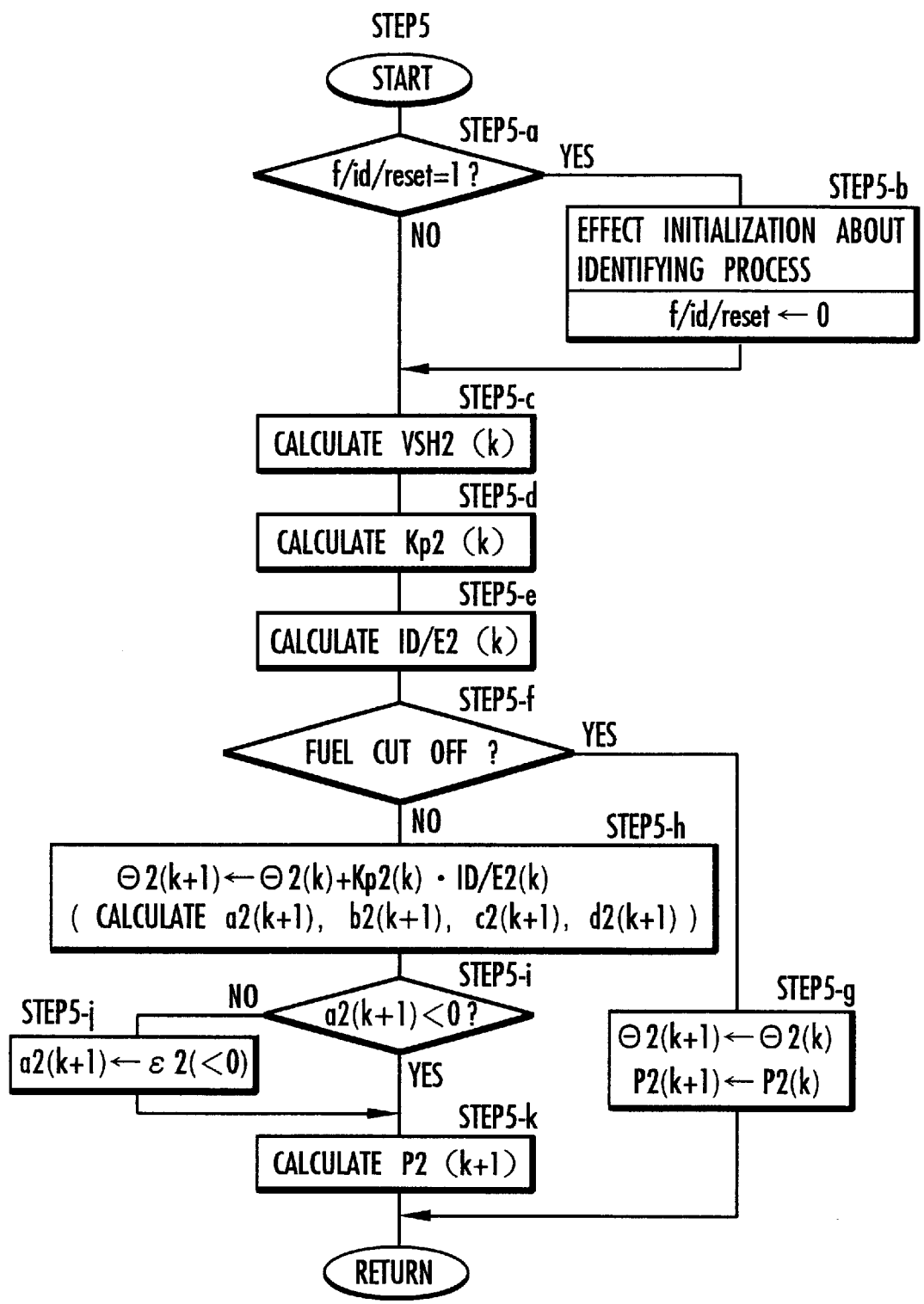
FIG. 20 is a flowchart of a major processing sequence according to the third embodiment.

The identifying process in STEP5 shown in FIG. 11 is carried out according to a processing sequence shown in FIG. 20. The processing sequence shown in FIG. 20 is basically the same as the processing sequence according to the first embodiment, and hence will briefly be described below.

If the value of the flag f/id/reset is "1" in STEP5-a, then the target air-fuel ratio calculating controller 6 performs an initialization with respect to the identifying process in STEP5-b. In this initialization, the identified values of the parameters a2, b2, c2, d2 of the cubic function are set to predetermined initial values, and the elements of the matrix P2 (diagonal matrix) according to the equation (28) are set to predetermined initial values.

Then, the target air-fuel ratio calculating controller 6 successively calculates a function output VSH2(k) (the function value of the cubic function) of the exhaust gas sensor 5 which corresponds to the present differential output kact(k) of the LAF sensor 4 and an identified error ID/E2(k) and a vector Kp2(k) which are required for the equation (26), according to the respective equations (24), (25), (27), in STEP5-c, STEP5-d, STEP5-e.

Then, the target air-fuel ratio calculating controller 6 decides whether the supply of fuel to the engine 1 is being stopped or not in STEP5-f. If the supply of fuel to the engine 1 is being stopped, then the target air-fuel ratio calculating controller 6 does not update the identified values of the parameters a2, b2, c2, d2 of the cubic function, but keeps the identified parameter vector Θ2 (see the definition of the equation (24)) whose elements comprise those identified values, at the preset values, and keeps the matrix P2 at the present value in STEP5-g.

If the supply of fuel to the engine 1 is not being stopped in STEP5-f, then the target air-fuel ratio calculating controller 6 updates the identified parameter vector Θ2 according to the equation (26) using the vector Kp2(k) and the identified error ID/E2(k) determined in STEP5-d, STEP5-e, thus determining the new identified values a2(k+1), b2(k+1), c2(k+1), d2(k+1) of the parameters a2, b2, c2, d2 in STEP5-h.

Then, the target air-fuel ratio calculating controller 6 decides whether the new identified value a2(k+1) of the parameter a2 is negative or not in STEP5-i.

At this time, as described above, it is preferable that the identified value of the parameter a2, which is the coefficient of the term of third degree of the cubic function, be negative in appropriately approximating, with the cubic function, the air-fuel ratio-related characteristics of the output VS of the exhaust gas sensor 5 (NOx sensor), or particularly the gradient pattern (the gradient of the graph is greater in the air-fuel ratio range leaner than the air-fuel ratio corresponding to the minimum value of the output VS than in the air-fuel ratio range richer than that air-fuel ratio) of the graph of the air-fuel ratio-related characteristics in the vicinity of the minimum value of the output VS.

Therefore, if a2(k+1)≧0 in STEP5-i, then the target air-fuel ratio calculating controller 6 forcibly sets the latest identified value a2(k+1) of the parameter a2 to a predetermined value ε2 which is a sufficiently negative value (e.g., −0.01) in STEP5-j. In this manner, the identified value of the parameter a2 is limited to a negative value such that the gradient pattern of the graph of the air-fuel ratio-related characteristics of the output VS of the exhaust gas sensor 5 in the vicinity of the minimum value and the gradient pattern of the graph of the cubic function in the vicinity of the minimum value match each other.

After having limited the identified value a2(k+1) of the parameter a2, the target air-fuel ratio calculating controller 6 updates the matrix P2 according to the equation (28) for the processing in the next control cycle in STEP5-k.

The above processing sequence shown in FIG. 20 is carried out in STEP5 shown in FIG. 11 by the target air-fuel ratio calculating controller 6.

In this embodiment, the target air-fuel ratio calculating controller 6 calculates a target differential air-fuel ratio kcmd(k) in the present control cycle according to the equation (29) using the latest identified values a2(k+1), b2(k+1), c2(k+1) of the parameters a2, b2, c2 in STEP6 shown in FIG. 11.

Other processing details of the target air-fuel ratio calculating controller 6 than STEP5, STEP6 shown in FIG. 11 are identical to those of the target air-fuel ratio calculating controller 6 according to the first embodiment.

The control apparatus according to the third embodiment uses the cubic function as a nonlinear function representing the air-fuel ratio-related characteristics of the output VS of the exhaust gas sensor 5 (NOx sensor), and then sequentially identifies the values of the parameters a2, b2, c2, d2 of the cubic function. Therefore, it is possible to obtain a cubic function that well approximates the air-fuel ratio-related characteristics of the output VS of the exhaust gas sensor 5 (NOx sensor), including the gradient pattern of the graph. Using the cubic function thus obtained, it is possible to determine, with high accuracy, a target air-fuel ratio KCMD of the engine 1 for minimizing the NOx concentration detected by the exhaust gas sensor 5 (NOx sensor), i.e., the NOx concentration after NOx has been purified by the catalytic converter 3. By controlling the air-fuel ratio of the engine 1 at the target air-fuel ratio KCMD according to a feedback control process, the catalytic converter 3 can well purify NOx in a manner to maximize the purification rate of NOx, and can well purify various gas components including NOx.

The third embodiment may also be modified in the same manner as described above with respect to the first embodiment. Specifically, the independent variable of the cubic function may represent the NOx concentration recognized from the output VS according to the characteristics shown in FIG. 2, rather than the output VS of the exhaust gas sensor 5 (NOx sensor).

The exhaust gas sensor 5 (NOx sensor) may comprise an NOx sensor having negative characteristics as indicated by the imaginary-line curve in FIG. 2. With such negative characteristics, the output of the exhaust gas sensor 5 has a maximum value at the air-fuel ratio of the engine 1 at which the NOx concentration detected by the exhaust gas sensor 5 has a minimum value. When the cubic function is expressed according to the equation (23) with the output of the exhaust gas sensor 5 being used as the dependent variable, if the value of a differential air-fuel ratio kact which maximizes the function value of the cubic function is determined, then it is possible to determine a target air-fuel ratio of the engine 1 for minimizing the NOx concentration detected by the exhaust gas sensor 5, i.e., a target air-fuel ratio of the engine 1 for maximizing the purification rate of NOx by the catalytic converter 3. Since the gradient of the graph of the air-fuel ratio-related characteristics of the output of the exhaust gas sensor (NOx sensor) of negative characteristics near the maximum value thereof is greater in the air-fuel ratio range leaner than the air-fuel ratio corresponding to that maximum value than in the air-fuel ratio range richer than the air-fuel ratio, it is preferable to limit the-value of the parameter which is the coefficient of the term of third degree of the cubic function to a positive value, unlike the third embodiment.

A control apparatus according to a fourth embodiment of the present invention will be described below with reference to FIGS. 21. The control apparatus according to the fourth embodiment differs from the control apparatus according to the third embodiment (which employs a cubic function) with respect to the type of an exhaust gas sensor, i.e., the type of a gas component that is detected, and part (specifically, the processing in STEP5, STEP6 shown in FIG. 11) of the processing sequence of the target air-fuel ratio calculating controller, and is identical to the control apparatus according to the third embodiment with respect to other system details and operation. Therefore, those parts of the control apparatus according to the fourth embodiment which are identical to those of the control apparatus according to the third embodiment are denoted by identical reference characters, and will not be described in detail below.

In the fourth embodiment, the exhaust gas sensor 5 comprises an HC sensor, or specifically an HC sensor of positive characteristics, described in the second embodiment. The nonlinear function representing the air-fuel ratio-related characteristics of the output VS of the exhaust gas sensor 5 comprises a cubic function according to the equation (23) as with the third embodiment.

As shown in FIG. 16, according to the air-fuel ratio-related characteristics of the output VS of the exhaust gas sensor 5 as an HC sensor, the graph has different gradients in the air-fuel ratio ranges on both sides of the air-fuel ratio value, i.e., AF5 or AF6 shown in FIG. 16, where the output VS is minimum, i.e., the air-fuel ratio range leaner than the air-fuel ratio value and the air-fuel ratio range richer than the air-fuel ratio value. Specifically, the graph gradient is basically smaller in the air-fuel ratio range leaner than the air-fuel ratio value at which the actual output VS of the exhaust gas sensor 5 (HC sensor) is minimum, than in the air-fuel ratio range richer than the air-fuel ratio value, unlike the NOx sensor.

In expressing the air-fuel ratio-related characteristics of the actual output VS of the exhaust gas sensor 5 (HC sensor) in the vicinity of the minimum value thereof, in a manner to match the actual characteristics, with the cubic function according to the equation (23), it is preferable to limit the identified value of the parameter a2 which is the coefficient of the term of third degree of the cubic function to a positive value, i.e., to have the graph of the cubic function shaped as the solid-line curve shown in FIG. 18.

Figure 21:
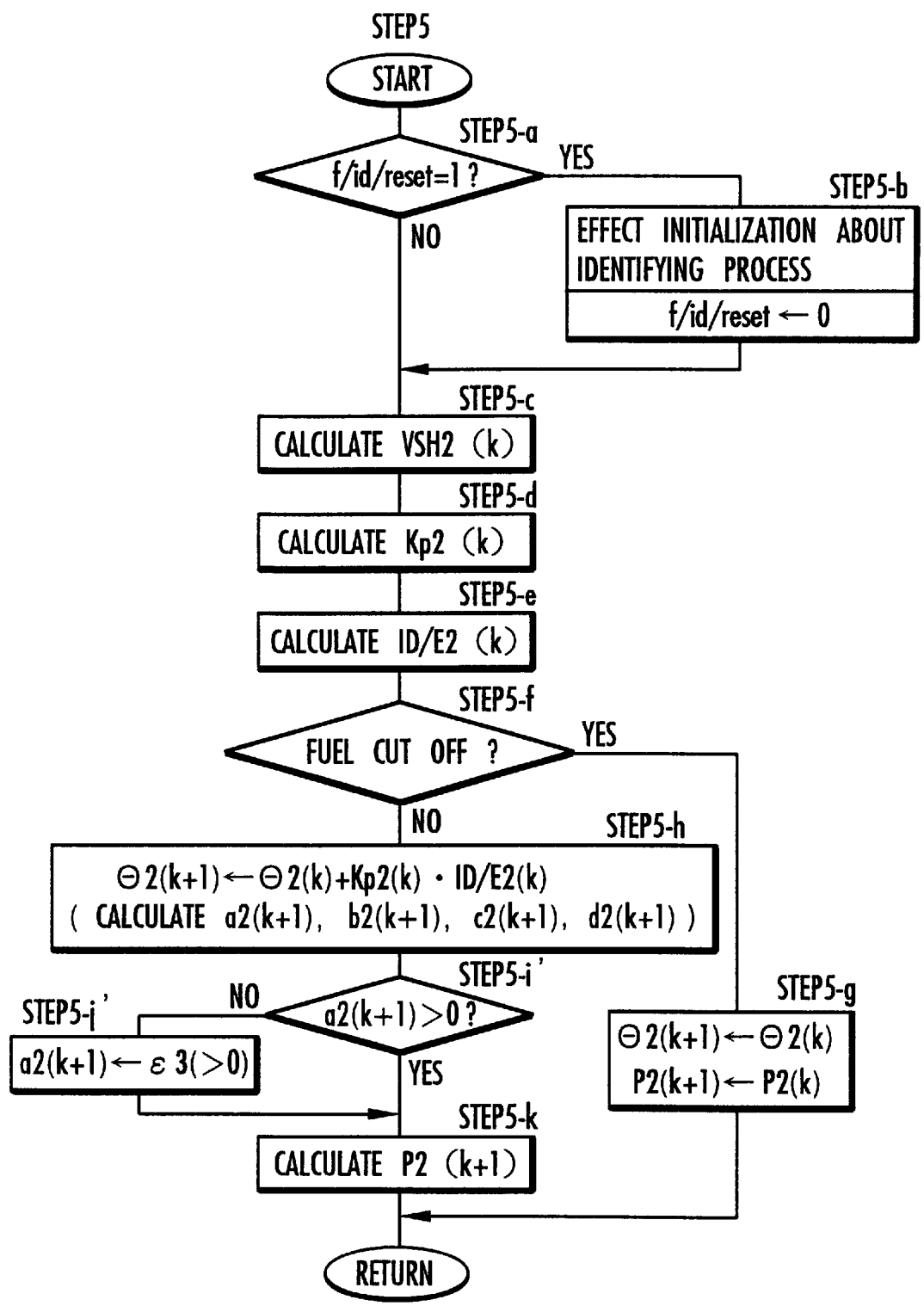
FIG. 21 is a flowchart of a major processing sequence according to a fourth embodiment of the present invention.

The target air-fuel ratio calculating controller 6 according to the fourth embodiment performs an identifying process according to a processing sequence shown in FIG. 21 in STEP5 shown in FIG. 11 to determine identified values a2(k+1), b2(k+1), c2(k+1), d2(k+1) of the parameters a2, b2, c2, d2 of the cubic function according to the equation (23).

The processing sequence shown in FIG. 21 differs only partially from the processing sequence shown in FIG. 20 according to the third embodiment. Those steps of the processing sequence shown in FIG. 21 which are identical to those of the processing sequence shown in FIG. 20 are denoted by identical step numbers, and will not be described in detail below.

After having determined the identified values a2(k+1), b2(k+1), c2(k+1), d2(k+1) of the parameters a2, b2, c2, d2 of the cubic function in STEP5-h, the target air-fuel ratio calculating controller 6 decides whether the identified value a2(k+1) of the parameter a2 is positive or not in STEP5-i'. If a2(k+1)>0, then the target air-fuel ratio calculating controller 6 performs the processing in STEP5-k. If a2(k+1)≦0, then the target air-fuel ratio calculating controller 6 sets the identified value a2(k+1) to a predetermined value ⊖3 which is a positive value (e.g., 0.01) in STEP5-j'. Thereafter, the target air-fuel ratio calculating controller 6 performs the processing in STEP5-k. Other processing details of the processing sequence shown in FIG. 21 are exactly identical to those of the processing sequence shown in FIG. 20.

According to the above process, the identified value of the parameter a2 is limited to a positive value such that the gradient pattern of the graph of the air-fuel ratio-related characteristics of the output VS of the exhaust gas sensor 5 as an HC sensor in the vicinity of the minimum value and the gradient pattern of the graph of the cubic function in the vicinity of the minimum value match each other.

In this embodiment which performs the processing in STEP5 shown in FIG. 11 in the manner described above, the target air-fuel ratio. calculating controller 6 determines a target differential air-fuel ratio kcmd of the engine 1 for minimizing the output VS of the exhaust gas sensor 5 (HC sensor), i.e., maximizing the purification ratio of HC by the catalytic converter 3, in STEP6 shown in FIG. 11 as follows:

The target differential air-fuel ratio kcmd is the value of the differential air-fuel ratio kact which minimizes the function value of the cubic function (the function output VSH2). In view of the fact that the identified value of the parameter a1 is positive, the value of the differential air-fuel ratio kact is one of two values (because the cubic function basically has minimum and maximum values) of the differential air-fuel ratio kact at which the first derivative of the cubic function is "0", which one of the two values is in the richer air-fuel ratio range.

In the present embodiment, the target differential air-fuel ratio kcmd is determined using the identified values of the parameters a2, b2, c2, or more specifically the latest identified values a2(k+1), b2(k+1), c2(k+1) thereof, according to the following equation (30):

$$kcmd = \frac{-b2 + \sqrt{b2^2 - 3 \cdot a2 \cdot c2}}{3 \cdot a2} \tag{30}$$

(a2=a2(k+1), b2=b2(k+1), c2=c2(k+1), a2>0)

Other processing details of the target air-fuel ratio calculating controller 6 than described above are identical to those of the target air-fuel ratio calculating controller 6 according to the third embodiment. The process that is carried out by the fuel supply controller 7 is identical to the process according to the first through third embodiment.

The control apparatus according to the fourth embodiment uses the cubic function as a nonlinear function representing the air-fuel ratio-related characteristics of the output VS of the exhaust gas sensor 5 (HC sensor), and then sequentially identifies the values of the parameters a2, b2, c2, d2 of the cubic function. Therefore, it is possible to obtain a cubic function that well approximates the air-fuel ratio-related characteristics of the output VS of the exhaust gas sensor 5 (HC sensor), including the gradient pattern of the graph. Using the cubic function thus obtained, it is possible to determine, with high accuracy, a target air-fuel ratio KCMD of the engine 1 for minimizing the HC concentration detected by the exhaust gas sensor 5 (HC sensor), i.e., the HC concentration after HC has been purified by the catalytic converter 3. By controlling the air-fuel ratio of the engine 1 at the target air-fuel ratio KCMD according to a feedback control process, the catalytic converter 3 can well purify HC in a manner to maximize the purification rate of HC.

The fourth embodiment may also be modified in the same manner as described above with respect to the third embodiment. Specifically, the independent variable of the cubic function may represent the HC concentration recognized from the output VS according to the characteristics shown in FIG. 14, rather than the output VS of the exhaust gas sensor 5 (HC sensor).

Figure 14:
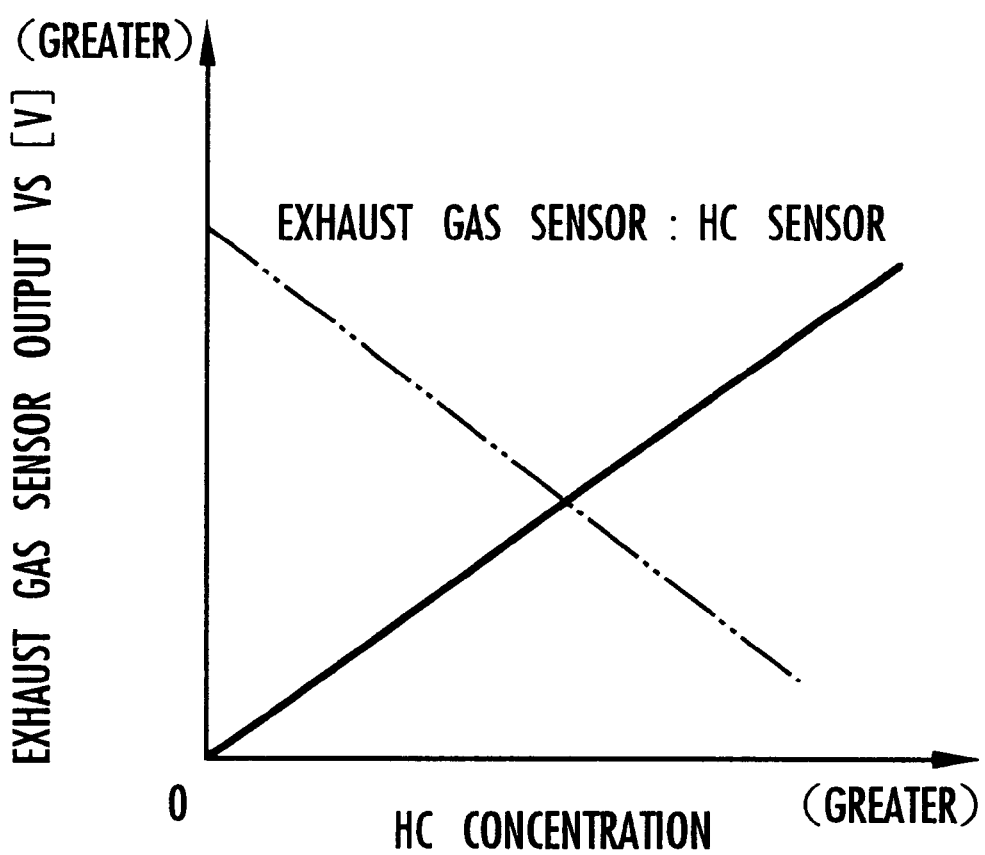
FIG. 14 is a diagram showing the output of an exhaust gas sensor (HC sensor) used by a control apparatus according to a second embodiment of the present invention.

The exhaust gas sensor 5 (HC sensor) may comprise an HC sensor having negative characteristics as indicated by the imaginary-line curve in FIG. 14. When the cubic function is expressed according to the equation (23) with the output of the exhaust gas sensor 5 being used as the dependent variable, if the value of a differential air-fuel ratio kact which maximizes the function value of the cubic function is determined, then it is possible to determine a target air-fuel ratio of the engine 1 for minimizing the HC concentration detected by the exhaust gas sensor 5. In view of the gradient pattern of the graph of the air-fuel ratio-related characteristics of the output of the exhaust gas sensor (HC sensor), it is preferable to limit the value of the parameter which is the coefficient of the term of third degree of the cubic function to a negative value, unlike the fourth embodiment.

Although not employed in the third and fourth embodiments which use a cubic function, in order to prevent the value ($b2^2-3 \cdot a2 \cdot c2$) in the square root in the equation (29) or (30) from becoming negative or "0", the values of the parameters a2, b2, c2, d2 may be identified while their identified values are being limited. Alternatively, if the value ($b2^2-3 \cdot a2 \cdot c2$) in the square root in the equation (29) or (30) which is determined by the identified values of the parameters a2, b2, c2, d2 becomes negative or "0", then the differential air-fuel ratio kact at which the function value of the cubic function (the function output VSH2) is "0" may be obtained as the target differential air-fuel ratio kcmd.

While the exhaust gas sensor 5 comprises an NOx sensor or an HC sensor in the first through fourth embodiments, a sensor for detecting another gas component to be purified by the catalytic converter 3, e.g., a CO sensor for detecting the concentration of a CO (carbon monoxide), may be used, and the air-fuel ratio of the engine 1 may be controlled to minimize the detected concentration of CO.

In the first through fourth embodiments, the quadratic or cubic function is used as the nonlinear function representing the air-fuel ratio-related characteristics of the output of the exhaust sensor or the concentration of the gas component recognized from the output of the exhaust sensor. However, another nonlinear function such as a hyperbolic function or the like may be employed as the nonlinear function.

Although certain preferred embodiments of the present invention have been shown and described in detail, it should be understood that various changes and modifications may be made therein without departing from the scope of the appended claims.

What is claimed is:

1. An apparatus for controlling the air-fuel ratio of an internal combustion engine, comprising:
    an exhaust gas sensor for detecting the concentration of a particular component in an exhaust gas purified by a catalytic converter which is disposed in an exhaust passage of the internal combustion engine, said exhaust gas sensor being disposed downstream of said catalytic converter;
    identifying means for identifying the values of parameters of a nonlinear function representing correlating characteristics of the detected concentration of the particular component with respect to an air-fuel ratio of the particular component upstream of said catalytic converter, using data representing the air-fuel ratio of the exhaust gas upstream of said catalytic converter and output data of said exhaust gas sensor;
    target air-fuel ratio calculating means for determining the value of an air-fuel ratio at which the concentration of the particular component that is represented by a function value of said nonlinear function whose parameters are identified by said identifying means is of a value satisfying a predetermined condition, using the identified values of the parameters of said nonlinear function, and obtaining the determined value of the air-fuel ratio as a target air-fuel ratio for the exhaust gas upstream of said catalytic converter; and
    air-fuel ratio manipulating means for manipulating the air-fuel ratio of an air-fuel mixture combusted by said internal combustion engine depending on the target air-fuel ratio determined by said target air-fuel ratio calculating means.

2. An apparatus according to claim 1, wherein said data representing the air-fuel ratio of the exhaust gas upstream of said catalytic converter, which is used by said identifying means to identify the values of the parameters of said nonlinear function, comprises data representing the difference between the air-fuel ratio of the exhaust gas and a predetermined reference value.

3. An apparatus according to claim 1, further comprising:
    an air-fuel ratio sensor disposed upstream of said catalytic converter, for detecting the air-fuel ratio of the exhaust gas upstream of said catalytic converter;
    said identifying means comprising means for identifying the values of the parameters of said nonlinear function using the air-fuel ratio detected by said air-fuel ratio sensor as the air-fuel ratio of the exhaust gas upstream of said catalytic converter.

4. An apparatus according to claim 3, wherein said air-fuel ratio manipulating means comprises:
    means for manipulating the air-fuel ratio of the air-fuel mixture combusted by said internal combustion engine according to a feedback control process for converging the air-fuel ratio detected by said air-fuel ratio sensor to the target air-fuel ratio determined by said target air-fuel ratio calculating means.

5. An apparatus according to claim 1, wherein said target air-fuel ratio calculating means comprises:
    means for determining, as said target air-fuel ratio, the value of an air-fuel ratio at which the concentration of said particular component represented by the function value of said nonlinear function is of a minimum value.

6. An apparatus according to claim 5, wherein said target air-fuel ratio calculating means comprises:
    means for, if the minimum value of the concentration of said particular component represented by the function value of said nonlinear function falls out of a predetermined range, determining the value of an air-fuel ratio at which the concentration of said particular component represented by the function value of said nonlinear function is of a predetermined value, using the identified values of the parameters of said nonlinear function, and obtaining the determined value of the air-fuel ratio as said target air-fuel ratio, instead of determining, as said target air-fuel ratio, the value of the air-fuel ratio at which the concentration of said particular component represented by the function value of said nonlinear function is of the minimum value.

7. An apparatus according to claim 1, wherein said identifying means comprises:
    means for sequentially identifying the values of the parameters of said nonlinear function according to a sequential identifying algorithm.

8. An apparatus according to claim 7, wherein said identifying means comprises:
    means for identifying the values of the parameters of said nonlinear function while limiting at least one of said parameters to a value satisfying a predetermined condition.

9. An apparatus according to claim 8, wherein said nonlinear function comprises a quadratic function, said identifying means comprising:
    means for using the coefficient of a term of maximum degree of said quadratic function as said one of the parameters which is limited to said value, and limiting and identifying the value of said coefficient such that the concentration of said particular component represented by the function value of said quadratic function has a minimum value.

10. An apparatus according to claim 8, wherein said nonlinear function comprises a cubic function, said identifying means comprising:

means for using the coefficient of a term of maximum degree of said cubic function as said one of the parameters which is limited to said value, and limiting and identifying the value of said coefficient such that the gradient of the graph of said cubic function in air-fuel ratio ranges on both sides of the value of an air-fuel ratio at which the concentration of said particular component represented by the function value of said cubic function has a minimum value, has a predetermined shape depending on the type of said particular component.

* * * * *